(12) United States Patent
Yutkowitz

(10) Patent No.: US 6,922,606 B1
(45) Date of Patent: Jul. 26, 2005

(54) APPARATUS AND METHOD FOR SMOOTH CORNERING IN A MOTION CONTROL SYSTEM

(75) Inventor: Stephen J. Yutkowitz, West Chester, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 752 days.

(21) Appl. No.: 09/711,443

(22) Filed: Nov. 13, 2000

Related U.S. Application Data

(60) Provisional application No. 60/166,625, filed on Nov. 19, 1999.

(51) Int. Cl.[7] .............................................. G06F 19/00
(52) U.S. Cl. ....................................... 700/187; 318/560
(58) Field of Search ................................. 700/187, 184, 700/186, 188, 189, 262; 318/560, 567

(56) References Cited

U.S. PATENT DOCUMENTS

| | | | |
|---|---|---|---|
| 4,648,024 A | 3/1987 | Kato et al. ................... 700/187 |
| 4,663,726 A | 5/1987 | Chand et al. ................ 700/252 |
| 4,772,831 A | 9/1988 | Casler et al. ............. 318/568.1 |
| 4,794,540 A | 12/1988 | Gutman et al. ............. 700/187 |
| 4,961,150 A | 10/1990 | Seki et al. ................... 700/187 |
| 5,028,855 A | 7/1991 | Distler et al. ................ 700/187 |
| 5,029,096 A | 7/1991 | Itaba ........................... 700/187 |
| 5,033,005 A | 7/1991 | Haske .......................... 700/187 |
| 5,132,913 A | 7/1992 | Seki et al. ................... 700/189 |
| 5,140,236 A | 8/1992 | Kawamura et al. ....... 318/368.1 |
| 5,198,161 A | 3/1993 | Ogura et al. ................ 264/40.1 |
| 5,227,978 A | 7/1993 | Kato ........................... 700/189 |
| 5,229,698 A | 7/1993 | Minnich et al. .......... 318/568.1 |
| 5,321,623 A | 6/1994 | Ensenat et al. ............. 700/189 |
| 5,390,292 A | 2/1995 | Takamura et al. ........... 345/420 |
| 5,394,323 A | 2/1995 | Yellowley et al. ............. 700/63 |
| 5,396,160 A * | 3/1995 | Chen ........................... 318/573 |
| 5,412,300 A | 5/1995 | Meyer et al. ............. 318/568.1 |
| 5,418,731 A | 5/1995 | Yoshimura et al. ......... 700/189 |
| 5,434,489 A | 7/1995 | Cheng et al. ............. 318/568.1 |
| 5,434,793 A | 7/1995 | Korner ........................ 700/189 |
| 5,438,522 A | 8/1995 | Crovella ..................... 700/189 |
| 5,515,290 A * | 5/1996 | Honda ......................... 700/187 |
| 5,602,968 A | 2/1997 | Volpe .......................... 700/262 |
| 5,682,319 A | 10/1997 | Boland et al. .............. 700/189 |
| 5,723,961 A | 3/1998 | Fujino et al. ............. 318/568.1 |
| 5,726,896 A | 3/1998 | Jia et al. ..................... 700/187 |
| 5,774,359 A | 6/1998 | Taneja ........................... 700/86 |
| 5,815,401 A | 9/1998 | Otsuki et al. ............... 700/189 |
| 5,872,714 A * | 2/1999 | Shaikh et al. ................. 700/98 |
| 5,955,856 A | 9/1999 | Sato et al. ................... 318/560 |
| 5,963,451 A * | 10/1999 | Seki et al. ................... 700/182 |
| 6,044,309 A * | 3/2000 | Honda ......................... 700/187 |
| 6,112,133 A * | 8/2000 | Fishman ..................... 700/182 |
| 6,294,755 B1 * | 9/2001 | Sawatzky et al. ....... 219/121.72 |
| 6,507,806 B1 * | 1/2003 | Tandler ........................... 703/1 |

FOREIGN PATENT DOCUMENTS

DE          42 13 927 A1       11/1993

* cited by examiner

Primary Examiner—Leo Picard
Assistant Examiner—Zoila Cabrera

(57) ABSTRACT

A method and apparatus for controlling motion through consecutive linear spans that define a corner in a desired motion path, such as a motion path in a machine tool system for example, is disclosed. In one embodiment, a plurality of data points that define a desired motion path is provided, and the plurality of data points define a plurality of consecutive spans. It is determined whether two consecutive linear spans define a corner having an angle within a predetermined range, and if so, a non-linear path is determined which connects to the two consecutive linear spans with continuity in curvature. An actuator is then controlled according to the non-linear path.

13 Claims, 14 Drawing Sheets

APPARATUS AND METHOD FOR SMOOTH CORNERING IN A MOTION CONTROL SYSTEM

This application claims the benefit of U.S. Provisional Application No. 60/166,625, filed on November 19, 1999.

TECHNICAL FIELD

The present invention relates generally to equipment and processes for controlling the motion of a movable member through a programmed path, and, more specifically, to an improved apparatus and method for motion control wherein corners on the path are identified and then smoothly blended to minimize discontinuities in velocity, acceleration, and/or jerk.

BACKGROUND ART

In a controlled motion system, such as a CNC (computer numerical control) controlled machine tool system for example, movable machine members are moved along a programmed path by programming the motion command and specifying position coordinates on the path. Linear paths are typically defined by programming the path end points on the line, circular paths are typically defined by programming the circle end points and circle center data, and arcuate paths are typically defined by programming a series of points along the arc. The operator of the machine tool can program these data points for the particular part to be machined. Motion along the path can be achieved by the CNC system by interpolating intermediate points between the programmed points at a predetermined repetition rate, and motion of the movable members can be controlled in response to these intermediate "interpolated" position commands.

Programmed points that represent a pair of consecutive linear spans oftentimes define a corner in the path. However, traversing such a corner can result in a step discontinuity in the commanded velocity of the movable member. Step discontinuities in velocity are undesirable because they can inject high frequency energy into the position control loop of a servocontroller providing the controlled motion, such that the actual motion achieved by the controller does not exactly track the command position trajectory represented by the path points.

Moreover, step discontinuities in velocity command result in a requirement of infinite acceleration in order for the controlled moveable member to actually follow the command. Infinite (or very large and fast changes in) accelerations are never actually achieved by the movable member due to the ultimate low-pass nature of the servo loops controlling the member, thus the command is not precisely duplicated by the motion of the member. A step discontinuity in velocity command can result in structural vibrations and wear of machine components, among other problems, such as mechanical deflection and cross-coupled axis dynamics where motion or vibration in one axis causes undesired motion or vibration on a separate axis. In the machine tool context, these undesirable phenomena can also result in unacceptable surface finish and/or reduced accuracy of the machined part.

While it has been known that commanding a full stop at the corner point can eliminate step discontinuities in velocity, such stops are undesirable because they increase the time required to complete the motion. Moreover, in the machine tool context, full stops can also create undesirable "dwell marks" on the workpiece.

Consequently, to avoid the speed limitations of using a full stop at corners, it has been known in the art to move through corners using some tolerable step velocity discontinuities, resulting in some tolerable amount of corner rounding. The degree of corner rounding that occurs depends on many factors including the axes position loop gains, the response characteristics of the velocity loop servos, the angle defined by the corner, and the orientation of the corner relative to the motion producing axes. Furthermore, the shape of the rounded corner is asymmetrical and is also a dependent of the aforementioned factors.

Circular arcs can be inserted at corners. However, such arcs can result in undesirable step discontinuity in acceleration, which can result in machine wear and poorly machined parts.

Thus, there remains a need for a method and apparatus for controlling motion through a corner in a programmed path which maximizes path velocity, and which also reduces or eliminates step discontinuities in velocity and acceleration. Moreover, there remains a need for such a method which increases the quality of the surface finish on a workpiece, and/or which minimizes the amount of rounding which is provided at the corner. In addition, there remains a need for such a method and apparatus which can also automatically identify corners which can benefit from a rounded path, and to then proceed to determine the rounded path to be utilized for those corners. In addition, there is a need for a method and apparatus which controls motion through a corner in a programmed machine tool path which eliminates step discontinuities in velocity and provides a desirable curvature at the corner on the machined part.

SUMMARY OF THE INVENTION

It is an object of the present invention to provide an apparatus and method which efficiently controls motion through a programmed turn or corner while reducing or eliminating step discontinuities in velocity and/or acceleration.

To achieve this and other objects, a method for controlling motion through consecutive linear spans that define a corner in a desired motion path is provided. The method comprises providing a plurality of data points that define a desired motion path, the plurality of data points defining a plurality of consecutive spans. The method also comprises determining whether two consecutive linear spans define a corner having an angle within a predetermined range. If two consecutive linear spans define a corner having an angle within the predetermined range, a non-linear path is determined which connects to the two consecutive linear spans with continuity in curvature. An actuator is then controlled according to the non-linear path that is determined.

According to another aspect of the invention, a method for controlling movement through a corner in a controlled motion path is provided. The method comprises providing a desired motion path that includes a corner portion, determining a non-linear path that has continuously varying curvature, and moving a movable member according to the non-linear path instead of the corner portion.

Still other objects of the present invention will become apparent to those skilled in this art from the following description wherein there is shown and described various embodiments of this invention, including a best mode contemplated for carrying out the invention, simply for the purposes of illustration. As will be realized, the invention is capable of other different aspects and embodiments without departing from the scope of the invention. Accordingly, the drawings and descriptions should be regarded as illustrative in nature and not restrictive in nature.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 14A–13C illustrates velocity, acceleration, and jerk profiles of a test case involving a conventional approach.

DETAILED DESCRIPTION OF EXEMPLARY EMBODIMENTS

Figure 1:
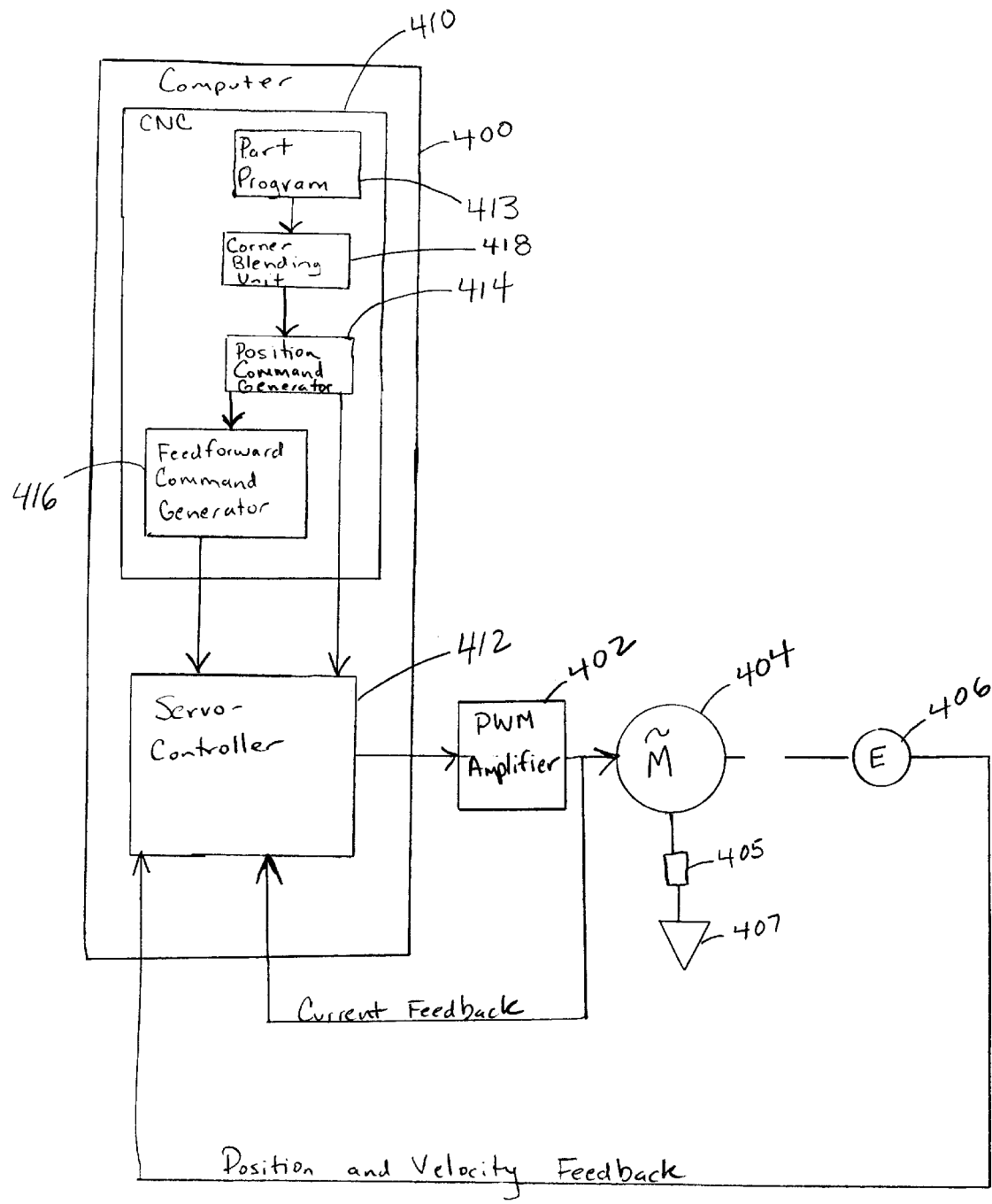
FIG. 1 is a block diagram illustrating an exemplary motion control system having spline corner blending capability, according to principles of the present invention.

FIG. 1 is a block diagram illustrating a potential hardware configuration for implementing a motion control system having corner blending capabilities according to the present invention. While the motion control methods and apparatus described herein can be utilized in conjunction with a machine tool system, it is contemplated that the control could be utilized in other contexts as well, such as in robotic and industrial machinery, for example, and other applications where controlled motion is desirable.

The illustrated system of FIG. 1 is microprocessor-based and includes a computer 400 having a CNC control unit 410 and a servo controller unit 412. The CNC control unit 410 includes a position command generator 414 that provides position commands (based upon a part program 413) to the servo-controller 412 and to a feedforward command generator 416. The part program 413 can be created by the user and describes the machining path to be followed by the machine tool, which is moved relative to a workpiece by actuator 404. Based upon the position commands and feedforward gains, the feedforward command generator 416 then provides feedforward commands to the servo-controller 412.

The actuator 404 imparts motion in one direction to a movable member 407 (e.g., a workpiece or tool) via a suitable linkage 405. In the machine tool context, it is typical that three directions of movement determine the location in space of the tool relative to the workpiece at any given instant in time, while two more directions of movement determine the workpiece's instantaneous relative orientation of the tool to the workpiece. Consequently, full control of such a workpiece and tool would require specification of five variables as functions of time, to thereby determine the motion path of the workpiece and tool and orientation thereof.

Typical machine tools incorporate at minimum three linear axes and a spindle. Higher capability machine tools augment the typical configuration with the addition of two rotary orienting axes to obtain a total of five positioning/orienting axes and one spindle. Specialized machine tools may contain additional axes that provide redundant capabilities or allow for simultaneous processing with multiple spindles.

Control variables in addition to location and orientation may be required to specify precisely the processing of the workpiece. In addition, the three directions of movement which determine the location of the workpiece or tool are typically linear and orthogonal, and an actuator 404 can be provided for each direction to cause the linear movement in that direction. The movable member 407 and the actuator 404, which causes its motion in one direction, are typically referred to as an axis. The three axes that typically define the location at a given instant in time are often specified as X, Y, and Z.

Corner Blending

According to one embodiment of the present invention, the CNC 410 also includes a corner blending unit 418 adapted to generate corner blends from the path points and commands in the part program 413. In one embodiment, the corner blending unit 418 operates as discussed below, and includes capability for causing the generation of position commands that result in smoothly rounded corners with no step discontinuity in velocity, and without requiring a full stop of the actuator 404.

From the position commands, feedforward commands, and feedback measurements, the servo-controller 412 then generates voltage command signals to be fed to a PWM (pulse width modulation) amplifier 402, as known in the art.

In an exemplary embodiment, the servo-controller 412 includes position, velocity, and current feedback loops and commutation functions for producing the voltage commands. The servo-controller 412 and PWM amplifier 402, along with a current measuring device for measuring the current from the amplifier, form a current control loop, as shown in FIG. 1. Other alternative configurations are also possible, such as where the tasks of controlling position velocity and current are distributed among separate hardware devices.

The voltage commands from the servo-controller 412 control the PWM amplifier 402. Three-phase voltages can be switched via the PWM amplifier 402 to the actuator 404 that, in one embodiment, can be an AC electric motor (permanent magnet "brushless DC" motor). Consequently, three phase currents are developed in the lines connecting the amplifier 402 and motor 404, and the amplitudes of these currents can be detected and fed back to the servo-controller 412 in a current control loop configuration.

In response to the three phase currents, the motor 404 is rotated and a movable member 407 (e.g., a workpiece or tool) connected to the motor 404 via a suitable linkage 405, is moved. An encoder 406 can be used for determining the position and velocity of the motor, which are fed back to the servo-controller 412. The present invention will work with any motor and drive type, including the type mentioned, but also including DC motors, hydraulic servos, linear motors, etc.

As can be understood, the corner blending unit 418, the feedforward command generator 416, and the position command generator 414 can be embodied as a program, programs, or sub-programs on a computer readable medium, such as a Read Only Memory (ROM) unit, or other persistent storage medium. These units can also be embodied as special purpose apparatus having executable instructions stored in Random Access Memory (RAM) or ROM, or a combination of both. Moreover, the instructions and/or programs can be implemented in any conventional programming language, such as, for example, C or C++, or can be implemented in a special purpose programming language. Similarly, many of the functions of the servo-controller 412 can be carried out according to programmed instructions.

In particular, and for the purposes of illustration, the corner blending unit 418 can be activated by placing a predefined code in the part program 413. When corner blending is activated, the unit 418 automatically inserts corner blends between every consecutive pair of linear spans defined in the part program 413 that define a corner and which, in one embodiment, meet the set of criteria described below.

As known in the art, a linear span can be programmed in the part program 413 by an appropriate motion control command and by specifying the coordinates of each of the two points on the path which define the line. As described below, in one embodiment, the user can add commands to the part program 413 that activate the corner blending unit 418. In these commands, the user can also specify a tolerance that defines the amount of deviation from the original corner path that will be permitted.

Figures 2, 3:
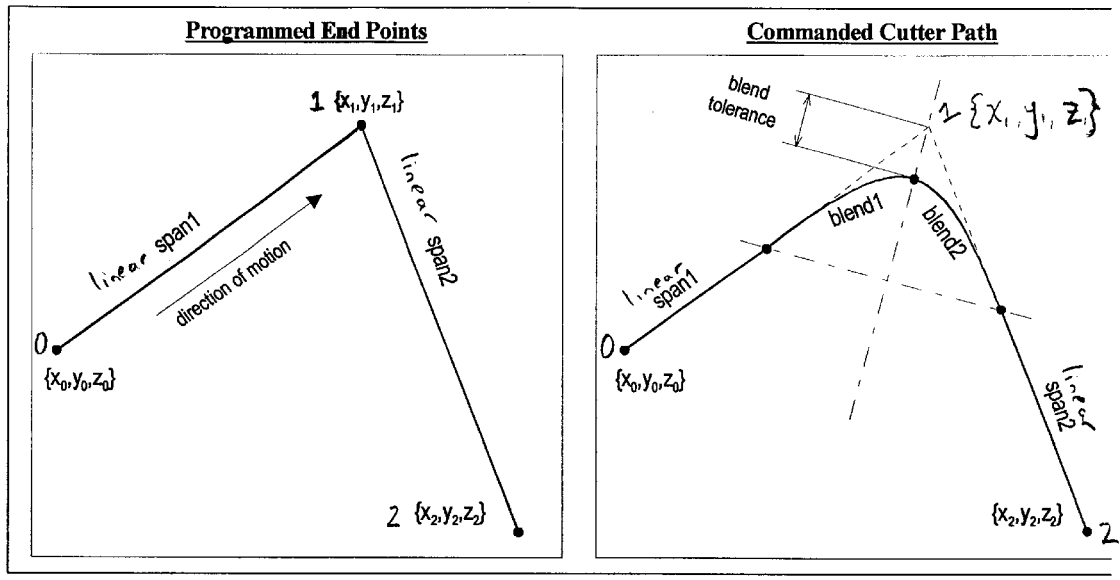
FIG. 2 illustrates exemplary programmed points in a part program which define a corner which can be traversed using a spline corner blend, according to principles of the present invention.
FIG. 3 illustrates an exemplary pair of spline spans used to smoothly move through the corner of FIG. 2, according to principles of the present invention.

The corner blending unit 418 can eliminate the sharp corner in the programmed path defined by the part program 413 by shortening the linear span entering into the corner, appending two curved spans to the end of the shortened linear span, and shortening the linear span coming out of the corner. This is illustrated in FIGS. 2 and 3. As shown in FIG. 2, the part program 413 may have commands for movement along two consecutive linear spans, span1 and span2, which are defined in the program by points 0, 1, and 2. Point 0 has Cartesian coordinates $X_0$, $Y_0$, $Z_0$, point 1 has Cartesian coordinates $X_1$, $Y_1$, $Z_1$, and point 2 has Cartesian coordinates $X_2$, $Y_2$, $Z_2$.

In this embodiment of the corner blending method and apparatus of the present invention, the two linear spans span1 and span2 are connected using two non-linear blend spans, shown in FIG. 3 as blend1 and blend2 that, in an exemplary embodiment, comprise non-linear curves, each of which connecting to a linear span with no discontinuity in curvature, and which connect to each other with no discontinuity in curvature. In addition, each curve has continuously varying curvature. To achieve this, and as described in further detail below, each of the curves can comprise fourth order polynomial spans. However, while the remainder of this document refers to a pair of fourth order spline spans that make up what is referred to herein as the "corner blend"(or non-linear path), it is contemplated that other embodiments of the present invention are possible as well. Other possible functions that could be used to realize the "corner blend" are spiral segments, B-splines, rational splines, and clothoid curves.

More specifically, according to this embodiment of the present invention, each inserted blend span, blend1 and blend2, can be constructed such that the magnitude of curvature of the corner blend varies from zero, at its point of transition to its respective linear span, to some maximum value at the point on the corner blend closest to the original corner (point 1). In an exemplary embodiment, blend1 and blend2 are constructed in this way such that there is no discontinuity in acceleration at the transition between the linear and blend spans. Thus, with this exemplary implementation, there is no need to constrain the path speed at the point of transition to avoid a large step discontinuity in acceleration.

For example, if circular spans were used instead of spline spans to define the corner blend, then the path speed at the transition between the linear and circular span would have to be constrained to be below a maximum value. This could result in slowdowns at the transitions and non-constant path speed through the circular arc. Accordingly, it has been found, according to one aspect of the present invention, that fourth order polynomial functions can be used to implement the present invention, in order to avoid discontinuity in acceleration and provide constant path speed.

In general, the principal actions of this embodiment of corner blending are the following:
determine whether the situation calls for a corner blend
determine if the corner spans can be inserted, and insert corner blend spans between the linear spans when deemed appropriate
determine if one or both of the linear spans should be replaced with a corner blend span, and re-define one or both of the linear spans as corner blend spans when appropriate
compute the length of the corner blend spans
compute the coefficient matrices for the blend spans in a local corner plane coordinate system
translate and rotate the coefficient matrices from the local corner plane coordinate system to a machine tool coordinate system, from which can be generated interpolated position commands.

Programming the CNC to Insert Corner Blends

The corner blend mode can be programmed by the user in the part program by using a predefined code, such as a G5 series code, for example. The code may include a parameter in its block to specify a blend tolerance. In an exemplary embodiment, the parameter is "modal" and persists until it is explicitly modified in the part program or the occurrence of a modal-states-reset event. The term "modal" refers to a type of part program command that causes the control to enter a certain mode of operation that applies to and persists throughout subsequent part program blocks until cancelled. By contrast "nonmodal" refers to a type of part program command that causes a certain mode of operation to occur only for the part program block in which the nonmnodal command is contained.

The blend tolerance parameter (referred to herein as "K") allows the programmer to specify the corner blend tolerance threshold in linear displacement units (millimeters or inches). In one embodiment, the parameter K is a modal parameter, so that its current value persists until it is explicitly changed. In a further exemplary embodiment, if K is programmed with the value zero, then corner blends are not inserted; if K is programmed with a negative number, then a default value for corner blend tolerance from a configuration database is used; if K is not explicitly programmed, then the current value for K is used; and, if a modal states reset event occurs, K is set to the default value from the configuration database.

The bend tolerance determines the degree to which the controller will round the span. However, the selection of the tolerance is a tradeoff between speed and accuracy. In particular, programming a large value for the corner tolerance results in quicker movement through the corner, but a larger deviation from the desired path. Programming a small value for the tolerance results in a closer reproduction of the desired path, but can decrease the speed at which the controlled motion is carried out.

Identifying Cases where Spline Cornering may not be used

As mentioned above, in one embodiment of the present invention, corner rounding is achieved by connecting two linear segments with one or more spline segments. However, according to another aspect of the present invention, a corner blend is not inserted except in particular circumstances that can be automatically identified. In particular, the spline cornering embodiment does not insert blend spans between two consecutive spans in any of the following situations:

One or both consecutive spans are defined as a circular interpolation spans.
One or both consecutive spans involve rotary axis motion.
The total set of axes in motion over both spans includes two parallel linear axes
The two consecutive spans are nearly collinear.
The angle between the two consecutive spans is so sharp that it is nearly a full reversal.

Reasons that the use of spline blends might be avoided in these situations will now be explained. The spline corner blend is not well suited for insertion between two spans that involve one or more circular interpolation spans. As an alternative, the control may assert a full stop (decelerate to zero) into the part program at the corner to avoid creating a velocity step. It is anticipated that other types of corner blends, such as blends that are circular arcs, could possibly be used in this situation. For example, it is contemplated that a tolerance-based corner blend could automatically be inserted at a sharp corner where one or both of the spans is a circular interpolation span.

Spline corner blends might also not be inserted between linear spans if one or both spans involve motion of a rotary axis. As noted above, the spline corner blend changes the geometry based on a specified tolerance. With rotary axis motion, the meaning of the tolerance cannot be resolved because the control does not have knowledge of the rotary axis' motion's effect on the relative motion between the cutting tool and workpiece. In one embodiment of the present invention, if a rotary axis is programmed, and spline cornering mode is active, then the span is not modified. Instead, a full stop (decelerate to zero) may optionally be asserted in the part program at the corner to avoid a step velocity.

The situation where the total set of motion axes from both spans contains two parallel axes can be treated similarly to the rotary axis case. In this case, in one embodiment, no blends are inserted and a decelerate to zero is applied to the first span.

If the two linear spans are nearly collinear, then a spline blend might also not be inserted. In the extreme case where the spans are exactly collinear, a spline blend cannot be formulated anyway. One way to determine if the two lines are nearly collinear is to compare the angle between the direction cosine vectors of each linear span to a predetermined minimum threshold. If the angle is below the minimum threshold, then the blend is not inserted. While choosing not to insert a corner may create a step velocity, if the threshold angle is acceptably small, then, even at the highest feedrates, the step velocity created by the corner will be insignificantly small. In one exemplary embodiment, the threshold angle is hard coded to about 0.02°, although other angles may be determined according to the step velocity that is tolerable.

If the angle between the two spans is very sharp, then a spline blend is also not inserted, according to an exemplary embodiment of the present invention. In the extreme case where the two spans involve a complete reversal, all the direction cosine components for one span are the negatives of the corresponding direction cosine components of the other span, and a spline blend cannot be formulated.

One way to determine if the angle is sharp is to compare the angle defined by the direction cosine vectors of the spans with a predetermined maximum threshold value. If it exceeds the maximum threshold, then a blend is not inserted. A decelerate to zero may be applied, if desired. In one embodiment, the threshold value for this case is about 178°, because it is believed that angles this sharp are not likely to be programmed in the part program and, if they are, a full stop would be acceptable.

Blend Insertion with Respect to Tolerance Value

In an exemplary embodiment of the present invention, corner blends are defined such that they have a maximum deviation from the originally programmed sharp corner that is less than or equal to the corner blend tolerance value. In one embodiment, the corner blending method and apparatus attempts to insert a blend whose maximum deviation from the programmed corner is the value for corner blend tolerance, as best shown in FIG. 3.

However, in certain situations, the length of one or both of the linear spans that comprise the originally programmed corner are too short to allow the maximum deviation to equal the tolerance. In these cases, according to one embodiment of the present invention, the blend that is inserted is closer to the corner than the blend tolerance. These cases are referred to herein as case 1, case 2, and case 3.

In case 1, the span entering the corner, designated by span1, is shorter than would be required to insert a blend span with the corner tolerance. A further qualification for case 1 is that the span exiting the corner, designated by span2, is either longer than twice the length of span1, or is longer than span1 and has one or more of the following properties, which indicate that a blend span is not required between span2 and its subsequent span (e.g., span3):

span2 is the last span of the program or span2 is a positioning mode span (i.e., a span in which a full stop at the end of span2 has been programmed explicitly) or span2 is not a spline corner blend mode span (i.e., a span in which the part program block associated with span2 commands that corner blend mode be cancelled such that it is required that no corner blend be inserted after span2) or the span following span2, e.g., span3, is not a "nonmodal linear interpolation span" (The term "nonmodal linear interpolation span" identifies a span that definitely will be interpolated as a linear span. The term is used to distinguish between: 1) spans that are programmed as linear but may be modified by the span preparation process to be of some nonlinear type and 2) spans that will definitely be interpolated as linear.) Under the conditions of case 1, and according to an exemplary embodiment of the present invention, span1 is converted into the first half spline (blend1), and the second half spline (blend2) is inserted after span1. Span2 is shortened by the appropriate amount.

Figure 4:
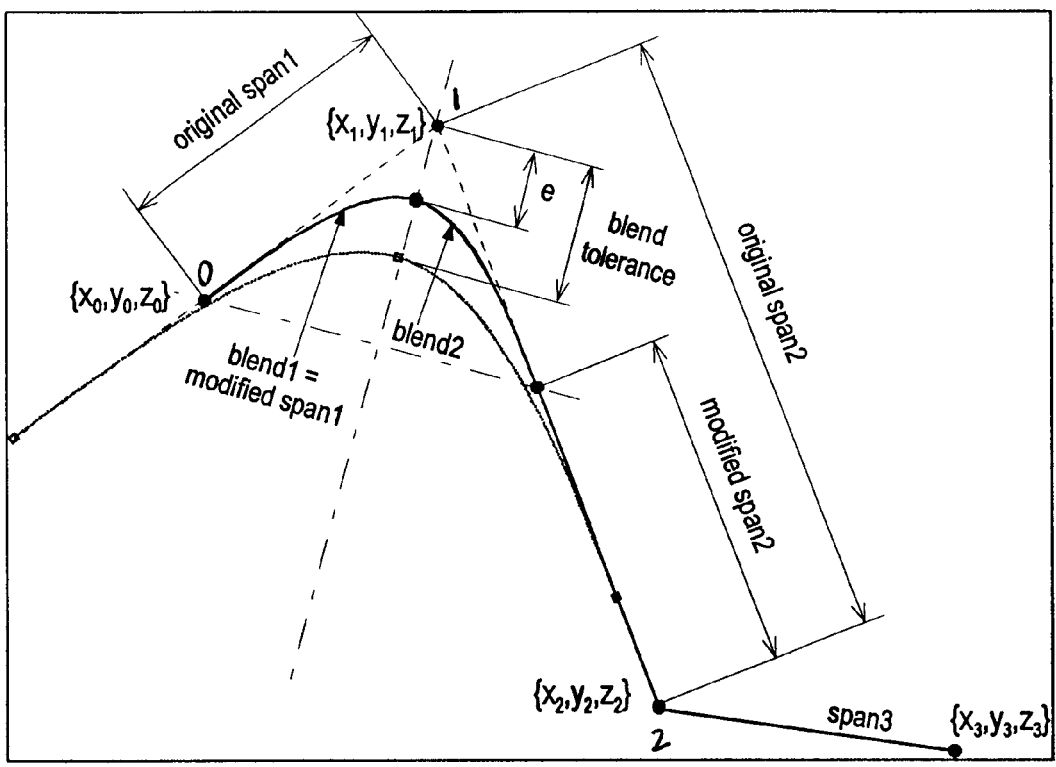
FIG. 4 illustrates an exemplary case where a first linear span is completely replaced by a spline span, and a second linear span is shortened to accommodate a second spline span, according to principles of the present invention.

The behavior of case 1 is illustrated in FIG. 4. The figure shows how the ideal blend, the curved dotted line, cannot be inserted because span1 is too short. It also shows how the deviation from the corner, e, is less than the corner blend tolerance. In the figure, original span refers to the original linear span prior to modification by the corner blending apparatus and method. This is the programmed span including possible modification by stages of span preparation processing that precede the span preparation stage where corner blending is carried out.

Figure 5:
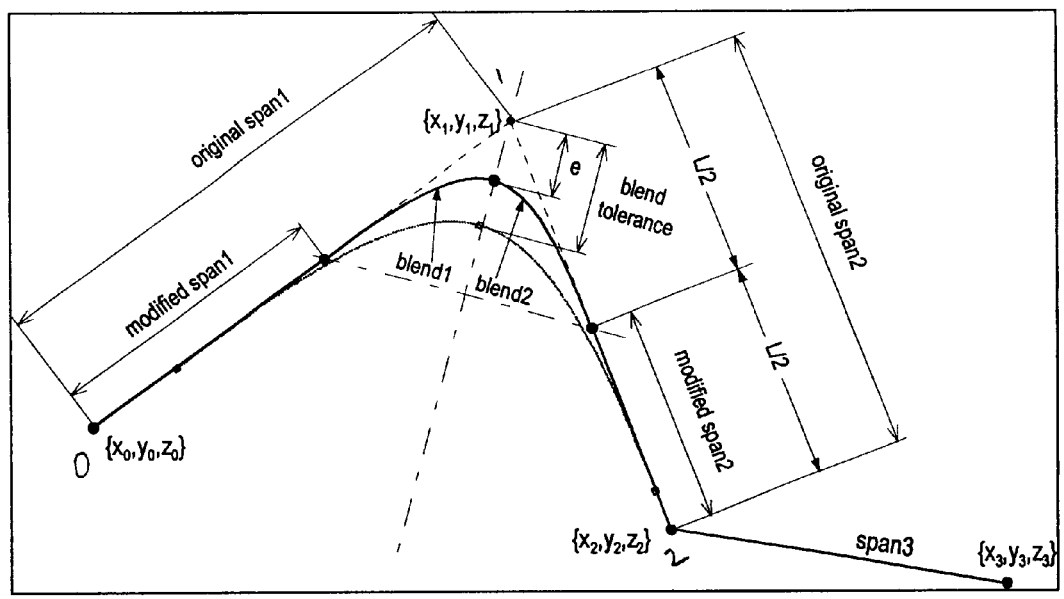
FIG. 5 illustrates an exemplary case where two linear spans are modified to accommodate two spline spans to define the corner, according to principles of the present invention.

In case 2, span2 is less than twice as long as span1, span2 does not meet any of the bulleted conditions listed above, and the ideal blend2 would have an end point that would cause span2 to be shortened by more than half In this case, blend1 is inserted after a modified span1, and blend2 is inserted before a modified span2, where the point of transition between blend2 and the modified span2 is the midpoint of the original span2. This case is illustrated in FIG. 5.

Figure 6:
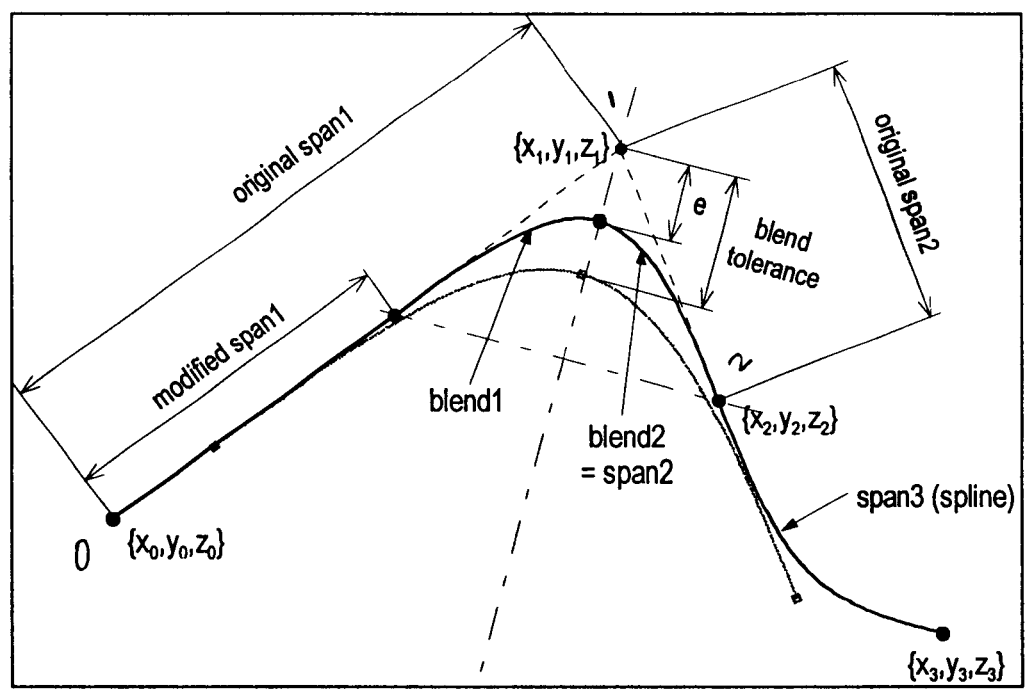
FIG. 6 illustrates an exemplary case where a first linear span is modified to accommodate a first spline corner span, a second linear span is replaced by a second spline corner span, which smoothly connects with the first spline corner span and a third spline span, according to principles of the present invention.

In case 3, span2 is shorter than span1, span2 is too short to accommodate the ideal blend, and span2 conforms to at least one of the properties of the bullet list above. In this case, blend1 is inserted after a modified span1 and span2 is consumed to create blend2. An example of such a case is shown in FIG. 6. The figure illustrates a case where span 2 meets one of the conditions in the bullet list, because span 3 is a spline span (not a "nonmodal linear interpolation span"). A similar case occurs when span1 and span2 are equal in length. In this case, both spans can be converted to blend spans.

Exemplary Equations for Splines

In an exemplary embodiment of the invention, the equations for the two spline blend spans can be obtained by first developing the equations in a two-dimensional "corner plane coordinate" system, and then transforming the equations into the three-dimensional machine tool axis-based coordinate system, which is referred to herein as the "interp coordinates" system.

Corner Plane Coordinate System

Figure 7:
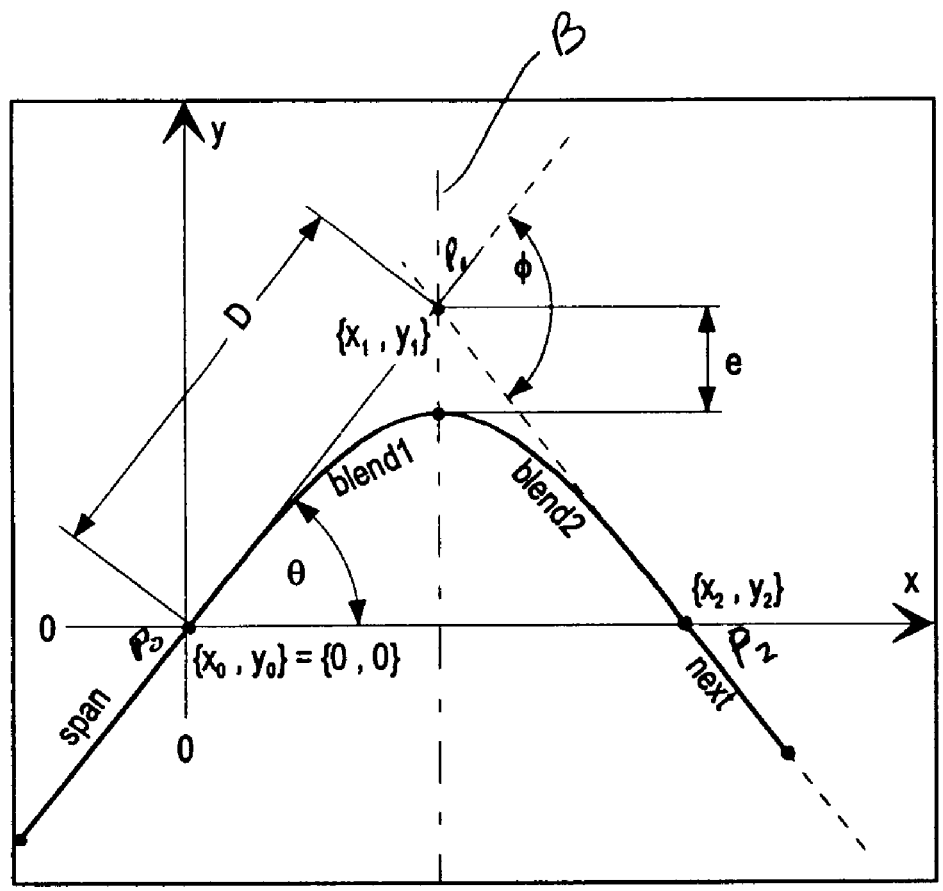
FIG. 7 illustrates an exemplary spline coordinate system, which can be utilized to define the spline corner spans, according to principles of the present invention.

The corner plane coordinate system and associated parameters for this embodiment are shown in FIG. 7. In the drawing and discussion below, points in this coordinate system are designated by $\{x, y\}$. Points in program coordinates (e.g. from the part program and possibly modified by stages of span preparation that precede the spline corner blend stage) are designated by $\{X, Y, Z\}$. Meanwhile, the identifiers blend1 and blend2 shown in FIG. 7 respectively refer to the first and second half spline corner spans.

In this embodiment, and as shown in FIG. 7, the origin of the corner plane coordinate system is located at the start of the first blend span blend1. The x-axis is defined to be in the direction from the start point of blend1 to the end point of blend2. The y-axis is parallel to the line B that bisects the corner.

The identifier span refers to the linear span entering the corner (i.e., the first of the two consecutive linear spans that define the corner). In FIGS. 2–6, the corresponding span is identified as span1. The identifier span is used to designate both the original linear span and the modified linear span. In cases where it is determined that the original linear span should be converted to the first blend span, span also designates the first blend span.

In FIG. 7, the identifier next is used to identify the linear span exiting the corner (i.e., the second of the two consecutive linear spans that define the corner). In FIGS. 2–6, it is shown as span 2. The identifier next is used to designate both the original linear span and modified linear span exiting the corner. It is also used for cases where the linear span exiting the corner is converted to blend2.

The coordinates $\{x_0, y_0\}$ in the corner plane coordinate system represent the start position of blend1, the coordinates $\{x_1, y_1\}$ represent the end of span coordinates of the original linear span, and the coordinates $\{x_2, Y_2\}$ represent the end point of blend2. These same subscripts will be used to represent the equivalent locations in program and interp coordinates.

The angle $\phi$ is equivalent to the angle between the direction cosines vectors of span and next. The angle 74 is used to identify the corner angle. The distance D represents the distance from the end of the original span1 where blend1 begins. The distance e represents the maximum deviation between the original corner and the spline corner blend.

The angles $\theta$ and $\phi$ can be obtained by computing the dot product of the direction cosines vector of span dot the direction cosines vector of next. This is shown in the following equation, where $\{c_{x1}\ c_{y1}\ c_{z1}\}$ are the components of the direction cosines vector of span and $\{c_{x2}\ C_{y2}\ C_{z2}\}$ are the components of the direction cosines vector of next:

$$\cos(\phi) = c_{x1}c_{x2} + c_{y1}c_{y2} + c_{z1}c_{z2} \qquad (1)$$

Moreover, the corner angle, $\theta$, is simply half of $\phi$, as can be verified by examination of FIG. 7.

$$\theta = \frac{\phi}{2} \qquad (2)$$

In the previous equations the subscripts x, y, z are used to designate the corner plane coordinate system for the span. These axes form a set of three mutually orthogonal linear axes, but are not necessarily the programmable X, Y, and Z-axes. For example a machine tool may contain more than three linear axes where the designators U, V, and W describe programmable axes that are parallel to X, Y, and Z respectively. A part program block could command motion on any combination of the existing programmable axes.

For example, two consecutive part program blocks that request motion in only X, V, and W would meet the conditions to allow for corner blending. In the discussion presented here, the designators for the corner plane coordinate system (x, y, z) would replace the programmable axes X, V, W for this example. However, two consecutive part program blocks that specify motion of parallel axes in either block would not meet the conditions that enable corner blending and a corner plane coordinate system would not be defined. The direction cosine components can be computed after the set of mutually orthogonal linear axes (corner plane coordinate system) has been determined.

Spline Coefficient Matrix

As noted above, in one exemplary embodiment, the corner blend comprises two nonlinear spans that are fourth order polynomial functions. In a further exemplary embodiment, each half (shown in FIG. 7 as blend1 and blend2) of the corner blend is represented as a fourth order polynomial in the parameter u. The parameter u is intended to match the distance along the nonlinear corner blend path as nearly as possible. The equation for each half blend can be written as follows, where [A] is a 2×5 matrix of coefficients:

$$\begin{Bmatrix} x \\ y \end{Bmatrix} = [A] \begin{Bmatrix} u^4 \\ u^3 \\ u^2 \\ u \\ 1 \end{Bmatrix} \quad (3)$$

One advantage of using a fourth order polynomial is that this is the minimum order required to allow the magnitude of the curvature vector to be zero at the transition point with the linear span (shown as span in FIG. 7) and to be maximum at the point of nearest approach to the sharp corner (i.e. the corner point defined by the original two linear spans, shown as $\{x_1, y_1\}$ in FIG. 7).

In particular, for the first half blend, blend1, parameterized by path distance s, the x and y components of the curvature vector are the second derivatives of the position vector components with respect to s. For a third order polynomial in s, the curvature components are linear functions of s. It has been found that a third order polynomial, which has a linear curvature versus path distance function, is incapable of allowing for the exemplary behavior in x-component of curvature (i.e., zero at the transition point with the linear span, nonzero during the transition, and zero at the point nearest the original corner).

However, for a fourth order polynomial in s, the curvature components are parabolic functions of s. Examination of FIG. 7 shows that the y component of curvature increases continuously over the first half of the blend. Conversely, the x component of curvature has a value of zero at the start of the first half of the blend, increases to a maximum value at some point on the first half blend, and decreases back to zero by the end point of the first half blend. Accordingly, a fourth order polynomial, with its parabolic curvature versus path distance function, is capable of producing a desired behavior of x-axis curvature. The identical argument can be made with regard to the second half blend span. In addition, it has been found that as the order increases beyond four, the shape of the blend between the end points becomes difficult to control. Thus, in an exemplary embodiment of the present invention, a fourth order polynomial in a parameter u, which closely approximates the path distance s, is used for blend1 and for blend2.

In one embodiment, each fourth order spline span has its own unique coefficient matrix [A]. The coefficients contained within [A] define the geometry of the spline span. In an exemplary embodiment, the coefficients can be derived by enforcing a set of constraints on the characteristics of the span. In order to fully specify the coefficients, the number of constraints can be one more than the order of the spline polynomial. This requirement is needed in order to enable the exact solution of the set of linear equations to be obtained when constraints are applied.

Listed below are the constraints for the first half spline blend span, in accordance with this embodiment of the invention. These constraints can be used to formulate the [A] matrix for the first half spline blend span. Then, the formulation of the [A] matrix for the second half blend span can be developed based on the results for the first half blend, such that the two blends are mirror images of each other. In order to achieve a desired curvature of the corner blend, and according to another aspect of the invention, five constraints can be applied to the first half spline blend span in this embodiment as follows:

1) The start point of the spline span blend1 is coincident with the end point of the first linear span (modified span).
2) The unit tangent vector at the start of the spline span blend1 is identical to the unit tangent vector of the linear span span (i.e., the direction cosines components of each span are identical at the span boundary)
3) The curvature at the start point of the spline span blend1 is a zero vector (i.e., the curvature at the span boundary matches the curvature of the first linear span, which is zero).
4) The unit tangent vector at the end of the spline span blend1 has 1.0 as its x-component and 0.0 as its y-component (i.e., it is parallel to the x-axis).
5) The curvature vector at the end of the spline span blend1 has a zero x-component and a negative y-component whose magnitude is specified based on considerations to be discussed below.

The constraints described above for this embodiment includes three parameters that are not contained within the span data that is programmed within the part program. These three additional parameters are the length of the blend span, s, the location where the linear span transitions to the spline span, and the magnitude of curvature at the end of the first spline span blend1. These parameters can be developed based on the corner blend tolerance (i.e., the y-coordinate of the end point of blend1), the required x-coordinate of the end point of blend1, and the requirement that the spline parameter u should approximate the path distance parameter s as closely as possible. Below, equations for these three parameters are developed. The remainder of this section develops the equations for the spline coefficient matrices assuming that all required parameters are known and available.

In this embodiment, the constraints for deriving the polynomial coefficients can be developed by assuming that the spline parameter u will be equivalent to the distance along the path s. However, it has been found that some formulations can be better than others at causing u to closely approximate s. As a result of this testing, it was determined that the last two constraints (horizontal tangent vector and vertical curvature vector at the peak of the blend) should both be present in order to force u to be nearly equivalent to s. At the end points of the spline span, the parameter u will be equivalent to the path distance s.

The first constraint (start position of blend1 being coincident with the modified span) may be written in equation form by evaluating the spline at u=0. The selection of the coordinate system origin as the start point of the first blend was intentional to simplify the constraint equations.

$$\bar{p}(u=0) \equiv \begin{Bmatrix} x_0 \\ y_0 \end{Bmatrix} = \begin{Bmatrix} 0 \\ 0 \end{Bmatrix} \quad (4)$$

The second constraint (initial direction being identical to tangent vector of span) can be written in equation form by setting the first derivative of p with respect to u at u=0 to be the unit tangent vector of span. The unit tangent vector components are the direction cosines of the linear span in the corner plane coordinates system, and the direction cosines can be computed directly from the angle θ defined in Equation 2.

$$\frac{d\bar{p}}{du}\bigg|_{(u=0)} \equiv \frac{d\bar{p}}{ds}\bigg|_{(s=0)} = \begin{Bmatrix} \cos(\theta) \\ \sin(\theta) \end{Bmatrix} \quad (5)$$

Turning now to the third constraint (of zero initial curvature), it can be written in equation form by setting the second derivative of p with respect to u at u=0 to be the zero curvature vector.

$$\frac{d^2\bar{p}}{du^2}\bigg|_{(u=0)} \equiv \frac{d^2\bar{p}}{ds^2}\bigg|_{(s=0)} = \begin{Bmatrix} 0 \\ 0 \end{Bmatrix} \quad (6)$$

The fourth constraint (end direction of blend1 being parallel to x-axis) equates the first derivative at the end point of blend1 with the unit vector parallel to the x-axis. The end point of blend1 can be obtained by evaluating the spline at u=S, where S is the total length of the blend span.

$$\frac{d\bar{p}}{du}\bigg|_{(u=S)} \equiv \frac{d\bar{p}}{ds}\bigg|_{(s=S)} = \begin{Bmatrix} 1 \\ 0 \end{Bmatrix} \quad (7)$$

Finally, the fifth constraint (of end curvature having zero x component and negative y component) equates the second derivative of the spline span position evaluated at the end of blend1 with the curvature vector directed in the negative y direction with a magnitude of κ.

$$\frac{d^2\bar{p}}{du^2}\bigg|_{(u=S)} \equiv \frac{d^2\bar{p}}{ds^2}\bigg|_{(s=S)} = \begin{Bmatrix} 0 \\ -\kappa \end{Bmatrix} \quad (8)$$

In this embodiment, these five constraints can be simultaneously applied to the spline equation of equation (3) to create the following matrix equation. In the following equation, the subscript 1 on $[A_1]$ is used to indicate that the coefficient matrix applies uniquely to the first half spline blend blend1.

$$\begin{bmatrix} 0 & \cos(\theta) & 0 & 1 & 0 \\ 0 & \sin(\theta) & 0 & 0 & -\kappa \end{bmatrix} = [A_1] \begin{bmatrix} 0 & 0 & 0 & 4S^3 & 12S^2 \\ 0 & 0 & 0 & 3S^2 & 6S \\ 0 & 0 & 2 & 2S & 2 \\ 0 & 1 & 0 & 1 & 0 \\ 1 & 0 & 0 & 0 & 0 \end{bmatrix} \quad (9)$$

Inverting the matrix on the right leads to an equation for the coefficient matrix $[A_1]$.

$$[A_1] = \begin{bmatrix} 0 & \cos(\theta) & 0 & 1 & 0 \\ 0 & \sin(\theta) & 0 & 0 & -\kappa \end{bmatrix} \begin{bmatrix} 1/(2S^3) & 0 & 0 & 0 & 1 \\ 1/(4S^2) & -1/(S^2) & 0 & 1 & 0 \\ 0 & -2/(3S) & 1/2 & 0 & 0 \\ -1/(2S) & 1/(S^2) & 0 & 0 & 0 \\ 1/(4S^2) & -1/(3S) & 0 & 0 & 0 \end{bmatrix} \quad (10)$$

Performing the matrix multiplication yields the final result for the coefficient matrix for the first half spline blend $[A_1]$.

$$[A_1] = \begin{bmatrix} \frac{\cos(\theta)-1}{2S^3} & \frac{1-\cos(\theta)}{S^2} & 0 & \cos(\theta) & 0 \\ \frac{2\sin(\theta)-\kappa S}{4S^3} & \frac{\kappa S - 3\sin(\theta)}{3S^2} & 0 & \sin(\theta) & 0 \end{bmatrix} \quad (11)$$

An analogous set of constraints applied to the second half blend results in a coefficient matrix $[A_2]$ for blend2 that has the following elements. The variable D that is present in the equation for $[A_2]$ is defined in FIG. 7. In a later section, an exemplary determination of D is discussed.

$$[A_2] = \begin{bmatrix} \frac{1-\cos(\theta)}{2S^3} & \frac{\cos(\theta)-1}{S^2} & 0 & 1 & 2D\cos(\theta)-S \\ \frac{2\sin(\theta)-\kappa S}{4S^3} & \frac{2\kappa S - 3\sin(\theta)}{3S^2} & \frac{-\kappa}{2} & 0 & \left(2D-\frac{S}{2}\right)\cos(\theta)-\frac{S}{2} \end{bmatrix} \quad (12)$$

Computing Peak Curvature κ, Blend Span Length S, and Break Point Distance D

In the previous section, the spline coefficient matrices of equations (11) and (12) were developed for the embodiment based on an assumption that the peak curvature κ, the length of the blend span, S, and the break point distance D were all known. This section derives equations for D and S by assuming that κ is known, and then discusses how κ can be selected to get an optimal path length parameterization. Once these three parameters are known, the matrix equations (11) and (12) can be defined for the spline blend spans blend1 and blend2.

The equations for obtaining D and S can be obtained by considering the first half blend span: blend1. Combining equations (3) and (11), and evaluating at u=S provides the x and y coordinates of the end point of blend1. The y-coordinate is that of the end point of the original linear span $y_1$ minus the corner blend deviation e (which is ideally the corner blend tolerance, as discussed above). The x-component is the end point $x_1$ of the original linear span.

$$\begin{Bmatrix} x_1 \\ y_1 - e \end{Bmatrix} = \begin{bmatrix} \frac{\cos(\theta)-1}{2S^3} & \frac{1-\cos(\theta)}{S^2} & 0 & \cos(\theta) & 0 \\ \frac{2\sin(\theta)-\kappa S}{4S^3} & \frac{\kappa S - 3\sin(\theta)}{3S^2} & 0 & \sin(\theta) & 0 \end{bmatrix} \begin{Bmatrix} S^4 \\ S^3 \\ S^2 \\ S \\ 1 \end{Bmatrix} \quad (13)$$

Evaluation of the previous equation leads to the following two equations:

$$x_1 = S\frac{1+\cos\theta}{2} \quad (14)$$

-continued $$y_1 = e + S\frac{\sin(\theta)}{2} + S^2\frac{\kappa}{12} \quad (15)$$

The terms $x_1$ and $y_1$ can be replaced by terms containing the parameters D and θ, and the following two equations can be obtained by inspection of FIG. 7:

$$x_1 = D\cos(\theta) \quad (16)$$

$$y_1 = D\sin(\theta) \quad (17)$$

Combining equations (14) through (17) yields the following two equations:

$$S = \frac{2D\cos(\theta)}{1+\cos(\theta)} \quad (18)$$

$$D\sin(\theta) = e + \frac{\sin(\theta)}{2}S + \frac{\kappa}{12}S^2 \quad (19)$$

An equation for the break point distance D, as a direct function of the known angle θ, the corner blend tolerance e, and the chosen peak curvature κ can be obtained by using equation (18) to eliminate the S terms in equation (19).

$$\left(\frac{\kappa}{3}\frac{\cos^2(\theta)}{(1+\cos(\theta))^2}\right)D^2 - \left(\frac{\sin(\theta)}{1+\cos(\theta)}\right)D + e = 0 \quad (20)$$

A solution for D could then be obtained by solving the above quadratic equation (20). However, such an approach might not be used because it results in two solutions for D and does not address how to select κ. An exemplary solution to equation (19) will be completed after the discussion of the selection of κ.

Experimentation has shown that the proper selection of κ could be important for obtaining a spline whose parameterization very nearly approximates the distance along the curve, i.e. u≈s. The selection of κ can be normalized by relating it to the radius r of a circle inserted into the corner that is tangent to the original linear spans at the break points defined by D. A curvature factor f can be defined to relate the circle curvature to the spline peak curvature iκ.

$$\kappa = \frac{f(\theta)}{r} \quad (21)$$

Examination of FIG. 7 can yield the following equation for the radius r of a circle that is tangent to the spans at both points $(x_0, y_0)$ and $(x_1, y_1)$.

$$r = D\cdot\cot(\theta) \quad (22)$$

Combining the previous two equations provides κ in terms of θ and D.

$$\kappa = \frac{f(\theta)\cdot\sin(\theta)}{D\cos(\theta)} \quad (23)$$

Equation (20) can then be solved for D by making use of equation (23).

$$\left(\frac{f(\theta)}{3}\frac{\sin(\theta)\cos(\theta)}{(1+\cos(\theta))^2} - \frac{\sin(\theta)}{1+\cos(\theta)}\right)D + e = 0 \quad (24)$$

After simplification and rearrangement, the previous equation takes on the final form shown below, and is an exemplary solution for D.

$$D = e\cdot\frac{(1+\cos(\theta))^2}{\sin(\theta)\cdot\left(1+\cos(\theta)\cdot\left(1-\frac{f(\theta)}{3}\right)\right)} \quad (25)$$

The curvature factor discussed above, f(θ), can be determined experimentally at a number of equally spaced angles θ spanning a range from about 50 to about 85°. The procedure outlined below can be executed for determining this factor:

1. A candidate value for $f(\theta=\theta_n)=f_{proposed}$, is selected.
2. The spline blend curves' coefficient matrices can be computed by employing equations (25), (23), (18), (11), and (12).
3. The corner blends can be interpolated using a constant step size Δu that is sufficiently small relative to the span length S to allow for observation of fine details.
4. The incremental change in path distance that occurs over each i'th interpolation interval, $\Delta s_i$, is computed as $\Delta s_i = \sqrt{(x_1-x_{i-1})^2+(y_i-y_{i-1})^2}$.
5. The maximum deviation from perfect parameterization that occurs during the span is computed as the maximum for all i of the quantity $E=\max(|1-\Delta s_i/\Delta u|)$.
6. The maximum parameterization error is used to determine a new value for $f_{proposed}$ using a technique such as a half interval search.
7. Steps 1–6 can be iteratively repeated until E or the change in $f_{proposed}$ is insignificantly small.
8. Steps 1–7 can be repeated for each value of $\theta_n$.

This procedure can be executed automatically, and one exemplary result is the table of values for f(θ) shown below.

| Experimentally Derived Values for f(θ) | | | | | | | | | |
|---|---|---|---|---|---|---|---|---|---|
| θ | <5° | 4° | 10° | 15° | 20° | 25° | 30° | 35° | 40° | 45° |
| f | 1.663000 | 1.663000 | 1.660402 | 1.657144 | 1.652704 | 1.646992 | 1.639998 | 1.631736 | 1.622312 | 1.612010 |
| θ | 50° | 44° | 60° | 65° | 70° | 75° | 80° | 85° | >85° | |
| f | 1.601355 | 1.589520 | 1.574291 | 1.558123 | 1.540571 | 1.521294 | 1.500016 | 1.476488 | 1.476488 | |

In actual implementation of spline cornering, the curvature factor for any value of θ within the maximum range of about 5° to about 85° can be determined using a look up table and employing linear interpolation for values of θ that lie between table entries. If θ0 is above about 85° or below about 5°, then the appropriate constant value is used.

Transformation to Machine Tool Coordinates

The previous sections provide the details to determine possible coefficient matrices for the first and second half corner blend spans (blend1 and blend2) represented in a corner plane coordinate system. However, when using such a corner plane coordinate system, the results can be transformed to the machine tool's coordinate system to enable the position command generator (shown as 414 in FIG. 1) to perform interpolation and apply position commands to physical machine tool axes.

In general, it is known that the coordinates of a point expressed in a local coordinate system can be transformed to a global coordinate system by: 1) multiplying by a matrix [R] to rotate the local coordinate system to be parallel to the global coordinate system, and 2) adding the vector {T} from the origin of the global coordinate system to the origin of the local coordinate system, where {T} is expressed using global coordinates.

$$\begin{Bmatrix} X \\ Y \\ Z \end{Bmatrix} = [R] \begin{Bmatrix} x \\ y \\ z \end{Bmatrix} + \{T\} \quad (25A)$$

An expression for the rotation matrix [R] can then be obtained by finding the projections of the point expressed in local coordinates onto each of the principal axes of the global coordinate system. Projections can be made by means of the vector dot product.

$X=(x\hat{u}+y\hat{v}+z\hat{w})\cdot\hat{i}T_x \rightarrow X=x\hat{u}\cdot\hat{i}+y\hat{v}\cdot\hat{i}+z\hat{w}\cdot\hat{i}=T_x$ $Y=(X\hat{u}+y\hat{v}+z\hat{w})\cdot\hat{j}+T$ $Y \rightarrow Y=x\hat{u}\cdot\hat{j}+y\hat{v}\cdot\hat{j}+z\hat{w}\cdot\hat{j}+T_Y$ $Z=(x\hat{u}+y\hat{v}+z\hat{w})\cdot\hat{k}+T$ $Z \rightarrow Z=x\hat{u}\cdot\hat{k}+y\hat{v}\cdot\hat{k}+z\hat{w}\cdot\hat{k}+T_Z \quad (25B)$ Expressing all unit vectors in the global system leads to the following representation of the unit vectors.

$$\hat{u} = \begin{Bmatrix} u_x \\ u_y \\ u_z \end{Bmatrix}; \hat{v} = \begin{Bmatrix} v_x \\ v_y \\ v_z \end{Bmatrix}; \hat{w} = \begin{Bmatrix} w_x \\ w_y \\ w_z \end{Bmatrix}; \hat{i} = \begin{Bmatrix} 1 \\ 0 \\ 0 \end{Bmatrix}; \hat{j} = \begin{Bmatrix} 0 \\ 1 \\ 0 \end{Bmatrix}; \hat{k} = \begin{Bmatrix} 0 \\ 0 \\ 1 \end{Bmatrix} \quad (25C)$$

Combining these representations of the unit vectors with the equations in Equation (25B) yields the following formulation for the rotation matrix:

$[R]=[\{\hat{u}\} \; \{\hat{v}\} \; \{\hat{w}\}] \quad (25D)$

For the specific case where the corner plane coordinate system is to be transformed to the machine tool coordinate system, a number of methods can be used. Transforming directly to interp coordinates is one possibility. As used herein, the term interp coordinates refers to the coordinate system in which offsets are applied to account for the part position and tool geometry. In such an embodiment, the spline blend span data can be converted from the corner-plane coordinate system to the interp coordinates coordinate system by applying rotation and translation transformations to the coefficient matrices (equations (11) and (12)). The rotation operation causes the coefficient matrices $A_1$ and $A_2$ to gain a row (i.e., their dimension increases from 2×5 to 3×5).

The first two columns of the rotation matrix may be determined by direct inspection of FIG. 7. The first column of the rotation matrix is the local system's x-directed unit vector specified in interp coordinates. It can be computed from the span data's command position for the span preceding blend1, $P_0=\{X_0, Y_0, Z_0\}$, and the span data's command position for blend2, $P_2=\{X_2, Y_2, Z_2\}$.

The coordinates X, Y, Z do not necessarily correspond to the logical axes of the same name. The notation is used to indicate the coordinates of the three mutually perpendicular linear axes that comprise the spline subspace of the interp coordinates coordinate system. Thus, from inspection of FIG. 7, the first column of the rotation matrix can be represented by the following, where the double vertical lines are used to indicate the vector norm (length):

$$\hat{u} = \frac{\bar{P}_2 - \bar{P}_0}{\|\bar{P}_2 - \bar{P}_0\|} \quad (26)$$

The equation for the second column of the rotation matrix can also be obtained by inspection of FIG. 7. It is a vector directed from the midpoint of the line connecting $P_0$ to $P_2$ toward the corner vertex $P_1$.

$$\hat{v} = \frac{\bar{P}_1 - \frac{1}{2}(\bar{P}_0 + \bar{P}_2)}{\|\bar{P}_1 - \frac{1}{2}(\bar{P}_0 + \bar{P}_2)\|} \quad (27)$$

Computing the cross product of the first two columns as shown below would generate the third column of the rotation matrix.

$$\hat{w} = \hat{u} \times \hat{v} = \begin{Bmatrix} u_y v_z - u_z v_y \\ u_z v_x - u_x v_z \\ u_x v_y - u_y v_x \end{Bmatrix} \quad (28)$$

Once rotation is complete, translation can be conducted. The translation vector is the location of the origin of the corner plane coordinate system expressed in (the spline subspace of) the interp coordinates coordinate system. Inspection of FIG. 7 indicates that the translation vector is equivalent to the end point of the span preceding blend1.

$\bar{T}=\bar{P}_0 \rightarrow T_X=X_0, \; T_Y=Y_0 T_Z=Z_0, \quad (29)$

Applying equation (25A) to one of the spline spans can then develop the transformation of a spline coefficient matrix [A] from the corner plane coordinates to interp coordinates. Since the z-coordinate of the corner-plane representation of the span is zero, the corner plane [A] matrix has only two rows, and only the first two columns of the rotation matrix are necessary to accomplish the rotation.

In the following set of equations, $[A_c]$ is the 2×5 coefficient matrix for the corner plane representation of the spline span and $[A_m]$ is the 3×5 coefficient matrix for the interp coordinates representation of the spline span. The same equation with the identical rotation and translation can apply to both blend1 and blend2 spans. The relationship between $A_c$ and $A_m$ can be derived as follows.

First equation (25A) can be written for the case of rotating from a planar coordinate system into a three dimensional coordinate system.

$$\begin{Bmatrix} X \\ Y \\ Z \end{Bmatrix} = \begin{bmatrix} u_x & v_x \\ u_y & v_y \\ u_z & v_z \end{bmatrix} \begin{Bmatrix} x \\ y \end{Bmatrix} + \begin{Bmatrix} T_X \\ T_Y \\ T_Z \end{Bmatrix} \quad (30)$$

Next, the corner plane coordinates can be written explicitly as a fourth order polynomial.

$$\begin{Bmatrix} X \\ Y \\ Z \end{Bmatrix} = \begin{bmatrix} u_x & v_x \\ u_y & v_y \\ u_z & v_z \end{bmatrix} [A_c] \begin{Bmatrix} u^4 \\ u^3 \\ u^2 \\ u \\ 1 \end{Bmatrix} + \begin{Bmatrix} T_X \\ T_Y \\ T_Z \end{Bmatrix} \quad (31)$$

The form of the spline equation in the three dimensional interp coordinates is the following:

$$\{XYZ\}^T = [A_m]\{u^4 \; u^3 \; u^2 \; u \; 1\}^T \quad (32)$$

Equating equation (31) to equation (32) yields the final result that relates $[A_m]$ (the corner plane coordinate representation of the spline span) directly to $[A_c]$ (the interp coordinates representation of the spline span, which can be used to conduct the movement).

$$[A_m] = \begin{bmatrix} u_x & v_x \\ u_y & v_y \\ u_z & v_z \end{bmatrix} [A_c] + \begin{bmatrix} 0 & 0 & 0 & 0 & T_X \\ 0 & 0 & 0 & 0 & T_Y \\ 0 & 0 & 0 & 0 & T_Z \end{bmatrix} \quad (33)$$

In the implementation, the addition of a matrix populated by mostly zeros need not be performed. Instead, the rotation can be applied first. Adding the translation components to the existing values can modify the final column of the rotated matrix.

Figure 10:
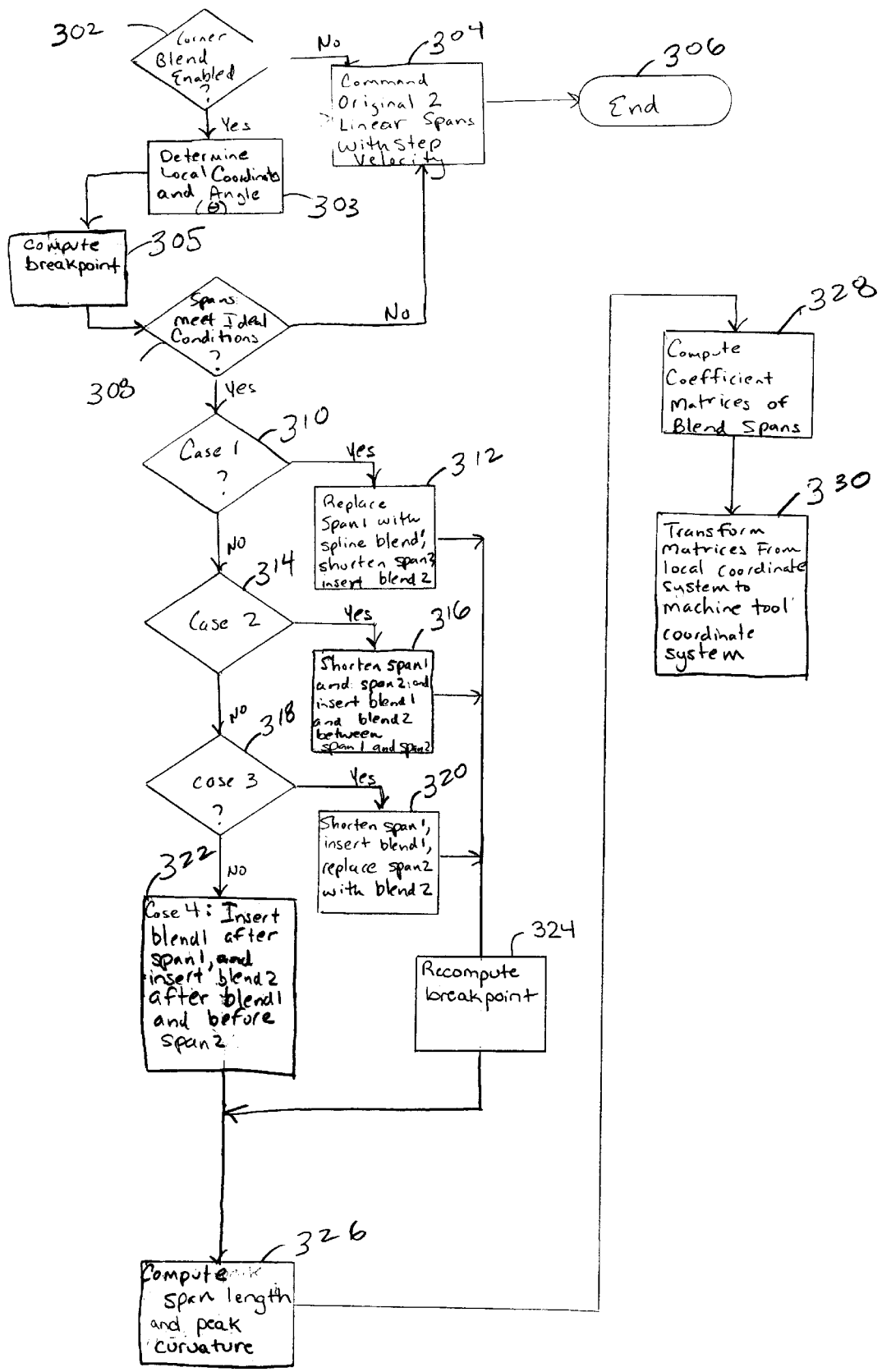
FIG. 10 is a flow diagram illustrating an exemplary method of conducting spline corner blending, according to principles of the present invention.

A number of specific steps and equations have been described for an embodiment of the spline corner blending method and apparatus of the present invention. Generally, the steps of this embodiment are shown in the flowchart of FIG. 10.

The first step (not shown) is to define the various linear spans within the part program, and to consider those consecutive linear spans. At step 302, it is determined whether the corner blending has been enabled, such as by recognizing a command within the part program. If the corner blending option has not been enabled, then the motion defined by linear spans can be conducted as originally programmed and is not altered, as shown at step 304. Accordingly, step velocities may result, unless full stops are commanded at the corners.

However, if the corner blending feature is enabled, then the process continues to step 303. At this step, the local coordinate system for the corner defined by the spans can be selected. These axes form a set of mutually orthogonal linear axes.

At step 305, the break point distance can be computed. This value can be computed using equation (25) as discussed above. The curvature factor used in this equation can be selected from a lookup table that, in one embodiment, is constructed in advance, such as by using the process described above.

Then, step 308 can be executed, where it can be determined whether the consecutive spans in the part program meet the requirements for using corner blending. For example, in one exemplary embodiment, if the two consecutive linear spans define an angle that is very small, then corner blending is not used, as discussed above. Accordingly, the process continues to step 304, and the originally programmed motion can be commanded.

If the spans do meet the test of step 308, then the process continues to step 310, where it can be determined if the conditions for case 1 (discussed above) are met. If they are, then step 312 can be executed, and the first linear span can be replaced with a first spline span, the second linear span can be shortened, and a second spline span can be inserted between the first spline span and the shortened second linear span.

If case 1 is not met, then the process tests the spans for meeting the conditions of case 2 (discussed above), at step 314. If case 2 is met, then the process continues to step 316. At this step, the first linear span can be shortened by half the length of the second span, the second linear span can be shortened to half its original length, a first spline span can be inserted after the first linear span, and a second spline span can be inserted after the first spline span and before the second linear span.

If it is determined that the conditions for case 2 are not met, then the process continues to step 318, where it can be determined whether the conditions for case 3 are met. If they are, then step 320 can be executed. Accordingly, the first linear span can be shortened, the second linear span can be replaced with a second spline span, and a first spline span can be inserted between the shortened linear span and the second spline span.

If the conditions for either case 1, case 2, or case 3 are met, and after the appropriate blend spans are inserted, a new break point distance can be computed based on how the linear span(s) were shortened in steps 312, 316, or 320, as can be understood. However, if the answer to the determination at step 318 is also in the negative, then step 322 can be executed. At this step, the first linear span can be shortened and a first blend span inserted such that its nearest approach to the corner is equal to the blend tolerance. Likewise the second linear span can be shortened and a second blend span can be inserted between the first blend span and the second linear span.

The process then proceeds from steps 322 or 324 to step 326. At step 326, the blend length and peak curvature can be computed. These values can be computed using equations (18) and (23), as discussed above. As with equation (25), the curvature factor used in equation (23) can be selected from a lookup table that, in one embodiment, is constructed in advance, such as by using the process described above.

Once these values are computed, the process continues to step 328. At this step, the coefficient matrices of the two spline spans can be computed, such as by using equations (11) and (12) for example. Then, step 330 can be executed, and the matrices that are computed can be transformed from the local coordinate system to a coordinate system that is used for machine tool commands. Once the transformation is complete, the matrices can be used to generate position commands that result in smooth motion through the corner without step discontinuity in velocity.

Stage Processing and State Machine Implementation of Spline Corner Blending

A potential digital implementation of the corner blending described above will now be discussed. In this embodiment, implementation of the corner blending method and apparatus occurs during two of the multiple stages required to prepare a span for execution. In general, the first stage in which corner blend spans are operated on results in the construction of the spline coordinate matrices of equations (11) and (12) above. The processing of the corner blend span can be completed during the final stage of span processing. During the final stage, the corner blends' spline coefficient matrices can be transformed to machine tool coordinates.

In one embodiment, the location of the first stage (referred to herein as the spline corner blend stage, or SCB stage) is chosen to enable it to work as seamlessly as possible with other features of the CNC controller. In an exemplary embodiment, the spline corner blend stage takes place after a spline interpolation stage, if such interpolation is used, to allow for insertion of blends between linear spans that the spline interpolation stage decided to assign as linear.

Figure 11:
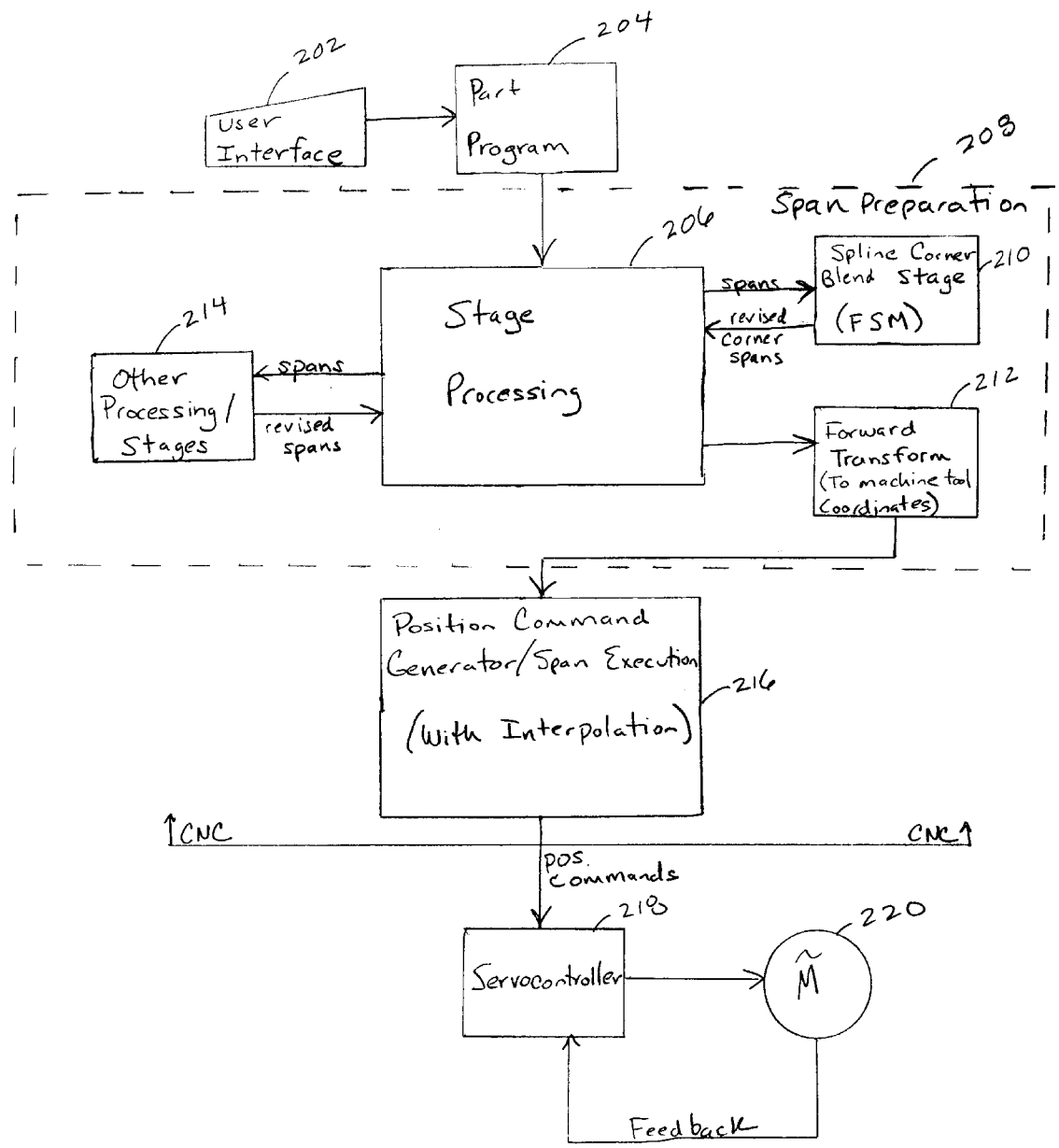
FIG. 11 is a diagram illustrating an embodiment of a spline corner blend motion control system, made in accordance with principles of the present invention.

FIG. 11 is a block diagram illustrating such an exemplary embodiment. By utilizing a suitable user interface 202, the user is able to create a part program 204, which includes the various machining commands which will be utilized to machine the workpiece, and motion commands and datapoints which define the path that the workpiece travels relative to the tool.

The part program 204 can be received by a span preparation unit 208 that includes a stage processing unit 206, which extracts the datapoints from the part program 204 that define the commanded motion path, and saves this data into data objects which represent various spans along the path. These spans can then be modified by span preparation unit 208, which, in this embodiment, comprises a program that operates according to the teachings of the present invention.

The span preparation unit 208 of FIG. 11 includes a spline corner blend (SCB) stage 210, and a set of operations performed as part of the general purpose forward transform stage 212. The SCB stage 210 receives span data that has already undergone a number of span preparation stages in the stage processing unit 206. Using this data, the SCB stage 210 decides whether inserting a corner blend at various places in the motion path would be beneficial. If so, then the SCB stage 210 revises the span data and/or inserts additional span data objects, so as to define a corner having continuity in curvature. For example and as discussed above, the data for two linear spans could be modified such that the spans are shortened, and two fourth order spline spans could be inserted between the shortened linear spans.

However, because these span modifications can take place in a coordinate system that is local to the corner, a forward transform stage 212 can be used to transform the data back to a global coordinate system that can be used for actual machine tool execution. Accordingly, the forward transform stage 212 transforms the modified data from the SCB stage 210, and provides the revised corner spans to the span preparation unit 208.

It is possible that other stages 214 could also operate on the data that is contained within the span preparation unit 208. Once the processing of span data is complete, it can be fed to a position command generator 216, which uses the data to generate position commands that can be fed to a servocontroller 218. In an exemplary embodiment, the position command generator 216 includes an interpolator for interpolating intermediate points between the datapoints that make up a span. The servocontroller 218 then uses the position commands to control a motor 220.

In one exemplary embodiment, the functions of the SCB stage 210 can be to:
Select the spline coordinate system of mutually perpendicular linear axes.
Decide whether a spline corner blend is possible.
Insert spline corner spans between linear spans and/or convert linear spans to spline corner spans.
Determine the spline span length, curvature, and break point distance parameters.
Construct the spline coefficient matrices.

In an exemplary embodiment, any remaining steps needed to complete the preparation of the spline spans can be deferred to the forward transform process during the final stage. These remaining steps can include converting the coefficient matrix to interp coordinates, computing the constraint vectors, and updating span data.

In order to accomplish its tasks, the first stage requires access to span data as originally defined by the part program and potentially modified by span preparation stages that precede the SCB stage. According to this embodiment of the invention, the various spans can be contained in a linked list. In particular, the SCB stage accesses the span data from the previous span (referred to as prev herein), span data from the next span (referred to as next herein), and possibly span data from the next span's next span (referred to as last herein). The current span (referred to herein as span or curr) is the span that is currently being prepared for completion by the spline corner blend stage. The prev span has completed all stage processing, including computation of constraints and generation of the span data parameters required for execution of the span.

Figure 9:
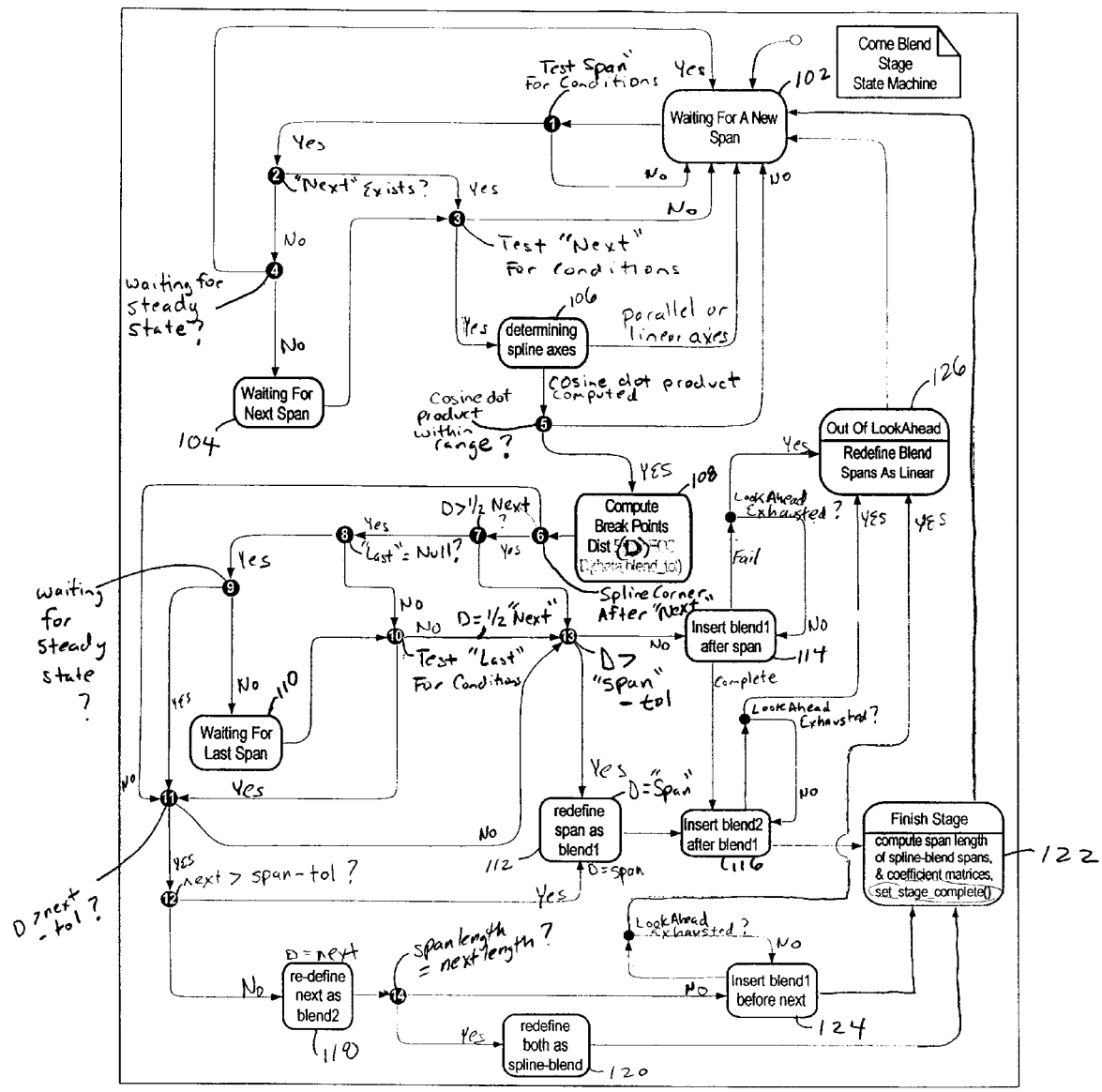
FIG. 9 is a finite state machine diagram, illustrating one embodiment of a spline corner blend system made according to principles of the present invention.

The spline corner blend (SCB) stage 210 can be implemented as a finite state machine (FSM). FIG. 9 is a diagram representing one potential FSM. The FSM "looks ahead" the required number of spans to decide whether the spans comprising the corner are long enough to allow for two spline corner blends to be inserted and the linear spans shortened, or whether one or both of the linear spans which define the corner needs to be converted to a spline span.

Figure 8:
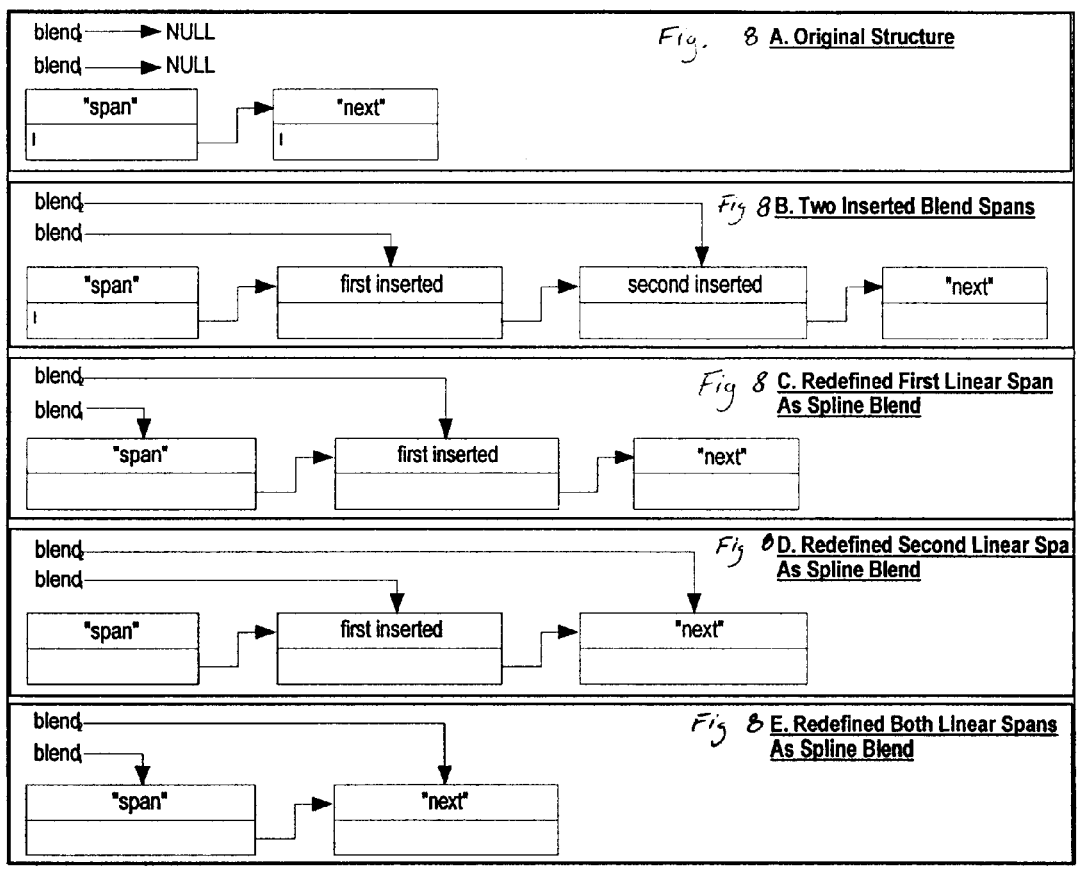
FIG. 8 illustrates an example of a linked list system, which can be used to define spline corner spans, according to principles of the present invention.

As shown in FIG. 8, the potential modifications to the list caused by this embodiment are shown as FIG. 8A through FIG. 8E. The span data from the part program can be kept in a linked list fashion and the list modified by the FSM embodiment of FIG. 9. In option A, no blends are inserted because the exemplary requirements for spline corner blending are not met. In this option, the list is not modified—span continues to point to next, and blend1 and blend2 point to null values. In operation, no spline cornering will be performed, and a step discontinuity in velocity will result, unless a full stop is commanded (see FIG. 2).

In option B, the list is modified so that two spans are inserted between the linear spans in the list, and the linear spans are shortened in length. In this option, blend1 points to the first inserted span in the list and blend2 points to the second. In operation, the two linear spans are shortened, and two smoothly connected spline spans are inserted between them (see FIG. 3).

In option C, the list is modified such that the blend1 points to span, and a span is inserted between span and next. Blend2 is then modified to point to the newly inserted span. In operation, this causes the first linear span to be replaced by the first half of the corner blend, the second linear span to be shortened, and the second half of the corner blend to be inserted between the first half and the shortened linear span (see FIG. 4).

In option D, a span is again inserted between span and next in the list. Blend1 then points to the inserted span and blend2 points to next. This causes the first linear span to be shortened, a second linear span to be replaced with the second half of the corner blend, and the first half of the corner blend to be inserted between the shortened linear span and the second half of the corner (see FIG. 6).

Finally, in option E, the list is modified so blend1 points to span and blend2 points to next. In operation, both linear spans are replaced by the two halves of the corner blend.

In general, the states of the FSM machine of the embodiment can be as follows:

The state transitions from WaitingForNewSpan through node 5, checks for the minimum requirements for spline corner blending, ensures that the minimum number of spans are prepared, and determines the indexes of the axes involved in the spline corner blend.

The state ComputeBreakPointsDist computes the distance from the end of the linear spans that defines the location of the transition between the linear and blend spans, assuming the ideal circumstances of sufficiently long linear spans.

The sequence of states from node 6 up to, but not including, the FinishStage state defines how the spline blends will be inserted (i.e., from the options of FIG. 8).

The state OutOfLookAhead can be entered when a spline span cannot be inserted because lookahead buffer is exhausted. Accordingly, no spline spans are inserted and option A of FIG. 8 can be executed.

The state Finish Stage computes the span length and corner plane coefficient matrices of the blend spans (i.e., computes equations (11) and (12) above).

Turning now to the details of the state machine embodiment of FIG. 9, the WaitingForNewSpan state 102 can be the: default state, and can be entered upon a reset or abort operation (e.g., because spline spans cannot be inserted), or upon completion of the calculation of the coefficient matrices for the spline blend spans. Upon invocation of the FSM while in this state, the FSM transitions to node 1, at which a number of conditions can be tested to ensure that the span data (i.e., the data from the part program which defines the first linear span) complies with the requirements for spline corner blending. If the span is not a positioning mode span (where motion is to be stopped at the corner), is not a non-motion span, is not the last span of a program, and does not contain any other indications that the span will end in a full stop, then the state transitions to node 2. Otherwise, the span is not appropriate for spline corner blending and the FSM re-enters the WaitingForNewSpan state 102. If the user has set the decelerate to zero option in the configuration, then the span can be executed with a deceleration to zero velocity, to avoid a step velocity discontinuity.

At node 2, the existence of next (the second span of the two spans which define a corner) can be determined. If next exists, the FSM transitions toward node 3. Otherwise, it transitions to node 4. At node 4, it can be determined whether the system is capable of providing a next span before the execution of span. If not, then a spline corner blend is not possible, and the FSM transitions back to the WaitingForNewSpan state 102. If the system is capable of providing a next span before the execution of span, then the FSM transitions from node 4 to WaitingForNextSpan state 104.

At the WaitingForNextSpan state 104, the spline corner blend stage is exited, and the span preparation unit ensures that, upon the next invocation of the spline corner blend stage, next is available and ready to be processed by the stage. Thus, on the next invocation of the spline corner blend stage, the FSM is at the WaitingForNextSpan state 104 and transitions immediately to node 3.

At node 3, next can be tested to ensure that it is a linear interpolation span, it is not a non-motion span, it does not require that span (the span before next) end in a full stop and it is not a span that involves modes of operation that precludes use of corner blending. If any one of these conditions is not met, then a spline corner blend should not be inserted, and the FSM can be returned to the WaitingForNewSpan state 102 in anticipation of some future invocation of the spline corner blend stage. If the user has set the decelerate to zero option in the configuration, then span can be executed with a full stop, to avoid velocity steps.

However, if the conditions are met at node 3, then the DeterminingSplineAxes state 106 can be entered, at which the set of three perpendicular axes that define the corner coordinate system for the spline corner blend can be determined. If it is determined that the axes involved in the motion form a set that includes any parallel linear axes or rotary axes, then a geometric interpretation of a spline corner is not possible, the stage is completed, and the FSM is returned to the WaitingForNewSpan state 102. In this case, the span can be linearly interpolated fully into the corner, with possible deceleration to zero if so indicated by the machine configuration.

The spline axes can be selected by assessing which machine axes experience motion through the corner in modified program coordinates. The axes experiencing motion during both span and next can be selected for the local coordinate system. In an exemplary embodiment, the spline axes selected comprise three perpendicular axes from the set of linear axes {X Y Z U V W}, where X, Y, and Z are perpendicular, and U, V, and W are perpendicular. The X and U axes are parallel, the Y and V axes are parallel, and the Z and W axes are parallel.

Once a set of mutually perpendicular linear axes is selected, the FSM can transition to node 5. During the transition to node 5, the cosine of the angle formed by the direction cosines of the two linear spans can be computed. In this embodiment, this computation of the so-called cosine dot product (which is equivalent to the cosine of the angle $\phi$ discussed above) is performed only with respect to the spline axes selected.

Then, at node 5, the cosine dot product can be compared to the hard-coded minimum and maximum values. If the cosine dot product is within the range in one embodiment for using spline blend cornering, then the FSM transitions to the ComputeBreakPointsDist state 108. However, if the value for the cosine dot product is not within the range, then application of spline blend cornering can be deemed inappropriate and the FSM state transitions to the WaitingForNewSpan state 102, the SCB stage is exited, and the span is interpolated using linear interpolation. A deceleration to zero can be imposed if the cosine dot product is greater than the maximum hard-coded limit, because this means that a sharp corner is defined by the two linear spans.

Accordingly, this embodiment of the invention has the capability to determine when the insertion of a corner blend is appropriate, based upon an angle defined by the two linear spans. If a corner blend is not appropriate, in one embodiment, linear interpolation can be used with a deceleration to zero if the angle is within a predetermined range. Of course, methods other than the comparison of the cosine dot product can be utilized for evaluating the sharpness of the corner, such as by direct comparison of an angle defined by the two linear spans to a predetermined value.

After node 5, the exemplary FSM of FIG. 9 transitions to the ComputeBreakPointsDist state 108 of the SCB stage.

This state determines the ideal distance from the end of the first linear span for transitioning to the first half of the corner blend. Modifications to this ideal distance may be necessary, and, if so, occur at other states of the FSM.

The value for the break point distance D can be calculated using the following steps:

Compute the corner angle: $\theta = \frac{1}{2} \cos(cos\_dot\_prod)$.

Compute the sine, cosine, and cotangent of $\theta$, and save the result for subsequent use during the FSM state Finish-Stage.

Compute $1/(1+\cos(\theta))$ and save the result for subsequent use during the FSM state FinishStage.

Determine the curvature factor f for the corner angle $\theta$ using a hard-coded lookup table of empirical data and linearly interpolating between table entries. Save f.

Determine the distance D from end of span using these intermediate results together with equation (25). Store the computed value for D.

Upon completion of the computation of D, the FSM transitions to node 6, which commences a series of transitions for defining the two spline blend spans, for inserting them in the span data linked list, and for modifying and/or replacing other spans in the list. The break point distance D can also be modified during these steps.

At node 6, it can be determined whether there is the potential for insertion or assignment of a spline blend corner following next. If this potential does not exist, then the state transitions to node 11, and bypasses the portion of the state machine that considers cases where next may require partitioning. In an exemplary embodiment, the potential for a blend following next does not exist if corner blending mode has been turned off in the next span (either explicitly from within the program or automatically during some earlier stage of span processing), if next is programmed in positioning mode, if next contains information that requires that it end in a full stop, or if next is the last span of the program. If the potential does exist, then the FSM transitions to node 7.

At node 11 (the potential for a blend following next does not exist), a test can be performed to check whether the ideal break point distance D is greater than the length of next minus a pre-defined length tolerance. The length tolerance (a separate parameter from blend tolerance) defines the minimum span length that is to be considered nonzero by the system. If the value of D is greater than the length of next minus the length tolerance, the state transitions to node 12. If not, then the state transitions to node 13, which begins a sequence of decisions regarding whether to create blend1 by inserting a span after span or by replacing the entire span as blend1. At node 7 (the potential for a blend following next does exist), D can be compared to one half the length of next. If D is greater than half the length of next, then it is likely D will be modified to be half the length of next, so that next can be equally partitioned for use in: 1) the spline blend between span and next, and 2) the spline blend between next and the span following next (i.e. last). When D is greater than half of next, the state transitions to node 8.

If D is not greater than half of next, then the state transitions to node 13 to begin the decision making regarding whether to replace span with a spline corner blend. At node 8, if last is not null, then the state immediately transitions to node 10. If last is null, then the state transitions to node 9.

If, at node 9, it is determined that last will not be made available before the execution of span, then a blend cannot be inserted after next, and the state transitions to node 11.

Otherwise, the state transitions to WaitingForLastSpan state 110, the span preparation unit is informed that the SCB stage is waiting, and the SCB stage is exited to allow the span preparation unit to prepare last.

When the SCB stage is re-invoked and the stage's FSM state is WaitingForLastSpan, the state immediately transitions to node 10. At node 10, a test can be performed to determine whether last has properties that would allow for the consumption of next with a spline span. If last is not a linear interpolation span, or last is a non-motion span, or last contains data that indicates its previous span (in this case next) must end in a full stop, or last is a type of span that precludes the possibility that it follows a spline corner blend span, then the state transitions to node 11 because a corner blend will not be generated for next and an equal partition of next is not necessary. If last does not have any of these properties, then the value for D can be re-assigned to be half the length of next, and the state transitions to node 13. This re-assignment of D guarantees that at least half of the original next will be available for the spline corner blend following next.

Node 13 performs the test that decides whether to insert blend1 after span or whether to consume span to create blend1. If D is greater than the length of span minus tol (where tol is the minimum length of a motion span), then all of span will be used to create the first half of the spline corner blend, D can be reassigned to be equal to the length of span, and the state transitions to RedefineSpanAsBlend1 state 112. If D is not greater than the length of span minus tol, then blend1 will be inserted following span and the state transitions to InsertBlend1AfterSpan state 114.

The actions performed during RedefineSpanAsBlend1 include changing span's nonmodal motion type from a linear axis move to a spline corner axis move and to point the pointer for blend1 to span. The computation of the new length of span can be deferred to the actions of the FinishStage state 122. After completing the actions for RedefineSpanAsBlend1, the state transitions directly to InsertBlend2AfterBlend1 state 116. The actions of the InsertBlend2AfterBlend1 state 116 are detailed below, and once they are completed, the linked list of spans will have the structure shown in FIG. 8C.

The first action performed upon entry of InsertBlend1AfterSpan can be to attempt to insert the new spline corner blend span in the linked list such that it follows span. The inserted span can be added to the linked list of spans directly after the span specified, and the span which followed the specified linear span can be assigned a new position in the linked list that immediately follows the inserted span. The data for the inserted span can be initialized to be equivalent to the data of the specified span, i.e., the data is "copied forward."

If, during the attempt to insert a new span after span, it is discovered that there is no available free space in the lookahead queue, then insertion can be said to have failed 110 and an additional test can be performed to determine whether "lookahead" is "exhausted." "Lookahead exhausted" describes a condition where it is determined that the system will be unable to free space in the lookahead queue prior to the point in the process where span is to be executed. In this case, a spline corner blend cannot be inserted and the FSM state transitions to OutOfLookAhead. If span insertion fails, and lookahead is not exhausted, then the span preparation stage management process can be notified that that the spline corner blend stage is waiting for the system to enter a condition where the lookahead queue once again contains a free space to accommodate an inserted span, the state transitions back to InsertBlend1AfterSpan, and control can be returned to the stage management process and the spline corner blend stage function exits.

At the point in the process where a space in the lookahead queue becomes available, the SCB stage can be re-invoked. At this invocation, the SCB stage is in the state InsertBlend1AfterSpan 114, the span insertion can be re-attempted, and if insertion fails again, the process just described can be repeated. Attempts to insert a span can be repeated until either a span is successfully inserted or lookahead is exhausted.

Once the InserteBlend1AfterSpan is able to successfully insert a new span in the list after span1, blend1 points to the "first inserted span", which is assigned to have the motion type: spline corner move1. In addition, the length and command positions of span can be modified to properly reflect the new shortened linear span. After the completion of the actions at the InsertBlend1AfterSpan state 114, the state can be transitioned to InsertBlend2AfterBlend1, and once the actions of that state are completed, the span linked list will have the structure of FIG. 8B.

As noted, once the InsertBlend1AfterSpan state 114 is successfully completed, the FSM transitions to the InsertBlend2AfterBlend1 state 116. The InsertBlend2AfterBlend1 116 state first attempts to insert a span in the linked list following the span pointed to by blend1. Unsuccessful insertion attempts can be treated in an analogous way to that described above with respect to InsertBlend1AfterSpan.

After successful insertion of the new span, blend2 is made to point to the newly inserted span, and the motion type of blend2 is specified to be spline corner move2. In addition, the length of next (the linear span following blend2) is modified to reflect that it has been shortened, and the command position for blend2 is defined. After the actions of InsertBlend2AfterBlend1 are completed, the FSM state transitions to FinishStage (which is discussed in detail below).

The discussion now returns to node 12 and the states that follow. As described previously, the state is node 12 when it is certain that a blend span will not be inserted after next and the ideal break point distance is greater than the length of next less the length tolerance. At node 12 a test can be performed to determine whether the length of next is greater than the length of span less the length tolerance. If next is longer than span by more than the length tolerance, then span will be consumed to create blend1, D can be changed to be equal to the length of span, and the state transitions to RedefineSpanAsBlend1 state 112. The path through the FSM from that point onward has been described above. After completing the path through the FSM, the span linked list for this case has the structure of FIG. 8C.

If, at node 12, it is determined that next is not a length tolerance longer than span, the state transitions to the RedefineNextAsBlend2 state 118. At this state, next will be consumed to form the second half blend, D can be changed to be the length of next, and the state transitions to node 14. At node 14, a test can be performed to check for the special case of span and next being within a length tolerance of each other. In the rare circumstances when this is the case, both linear spans can be consumed to create the two blend spans, and the state transitions to RedefineBothAsSplineBlend state 120.

The primary actions for RedefineBothAsSplineBlend state 120 can be simply to set blend1 to point to span and set its move type to be spline corner move1 (blend2 will already point to next and have its move type set to spline corner move2). The next action performed during RedefineBoth-AsSplineBlend is to set the span data variables that ensure that the first half blend span never ends in a full stop even if the control is in a "single block" mode where cycle start results in only the next part program block being executed. RedefineBothAsSplineBlend unconditionally transitions to FinishStage state 122, and the linked list of spans will have the structure of FIG. 8E.

The more common transition out of node 14 occurs when the lengths of span and next are not identical. In this case, the state transitions into InsertBlend1BeforeNext state 124. The actions of InsertBlend1BeforeNext can be nearly identical to the actions of InsertBlend1AfterSpan, with additional actions to ensure that the first half blend can never end in a full stop even if the control is in "single block" mode. After successful insertion of blend1, the state transitions to FinishStage and the linked list of spans has the structure of FIG. 8D.

Turning now to the OutOfLookAhead state 126, as noted above, it can be entered when span preparation's stage manager indicates that there is no free space available in the lookahead queue in which to insert a blend span, and that a space will not become available before the point in the program execution process where the span which requires an inserted span must be executed. This could potentially occur when the lookahead queue is short and multiple span preparation stages are used in combination with the SCB stage. It should be noted at this point that such a condition is extremely rare even if the lookahead queue is a minimum length queue of about twenty spans. Nevertheless, a state can exist to handle this circumstance, however unlikely.

In the finite state machine embodiment of FIG. 9, the OutOfLookAhead state 126 can be entered from the three span insertion states: InsertBlend2AfterBlend1 state 116, InsertBlend1AfterSpan state 114, and InsertBlend1BeforeNext state 124. As can be seen from examination of the FSM diagram, one or both of the blend spans may already be defined when the OutOfLookAhead state 126 is entered. Since OutOfLookAhead indicates that SCB cannot be accomplished, in one embodiment, any blend spans already defined can be converted back to linear spans. The steps for converting the span to linear can be identical regardless of whether the blend spans are inserted spans or are the re-defined span or next.

Conversion to linear involves setting the length of the linear span. The length of a blend span converted to a linear span is simply the break point distance D. The command position (end point) for the blend converted to linear need not be computed because it will already be correct. For blend1, the command position is that of the original linear span and will not have undergone modification.

As is also seen in the exemplary embodiment depicted in FIG. 9, entry into the state FinishStage occurs after successful creation of the first and second half blend spans blend1 and blend2. The actions of the FinishStage state 122 can be to:

Determine the value for peak curvature $\kappa$.

Determine the length of the blend spans.

Compute each blend's coefficient matrix (represented in corner plane coordinates).

Store some intermediate computations in data

In an exemplary embodiment, the peak curvature $\kappa$ is identical for both blend1 and blend2. It can be computed based on the break point distance D by employing equation (23). The equation requires the curvature factor f that has already been computed and stored in span data. The computation makes use of some of the intermediate variables stored in span data during the ComputeBreakPointsDist state 108. Once computed, the value for κ can be stored in the span data of both blend1 and blend2, as it will be required when computing constraint vectors (discussed below). Also in the exemplary embodiment, the span length S is identical for both blend1 and blend2. The span length can be computed using equation (18).

Some of the variables that may be needed for computation of the rotation transformation can also be computed during FinishStage, and stored in the data of blend1 and blend2. These variables include the inverse of the lengths of the base and height of the isosceles triangle formed by the start point of blend1, the original corner vertex, and the end point of blend2. These terms can be efficiently computed using the following equations.

The following two equations introduce the use of the C-code convention of "→", which indicates a reference of a pointer to a data structure. In this context, it simply indicates that a variable is associated with a particular span object. For example, in this case span→D represents the break point distance associated with the particular span span.

$$\text{triangle\_base\_inv} = \frac{0.5}{(span \to D) * (span \to \cos\theta)} \quad (34)$$

$$\text{triangle\_height\_inv} = \frac{1}{(span \to D) * (span \to \sin\theta)} \quad (35)$$

Finally, the blend spans' spline coefficient matrices in the corner plane coordinate system can be computed using equations (11) and (12).

After these computations are completed during the FinishStage state 122, the state of the SCB stage FSM transitions to WaitingForNewSpan state 102, the stage is completed, and control can be returned to the span preparation stage manager until a new span requiring a corner blend is encountered in the part program. After the SCB stage completes for span, subsequent stages can be executed until all stages for span are completed.

Forward Transform

In an exemplary embodiment, the final stage of span preparations is forward transform stage 212. Forward transform is the process where span data is transformed to machine tool coordinates (interp coordinates). At this point, span data can potentially be modified to account for various classes of translational and rotational offsets. The completion of the computations for the spline corner blend spans can be deferred to this point in the span preparation process to consider the effects on span data of any stages that follow the SCB stage, including the computations performed during forward transform.

The forward transform stage 212 can perform the following tasks on spline corner blend spans:

Transform the spline coefficient matrices to interp coordinates.

Compute the constraint vectors for rate limiting, i.e., max_tan, max_curv, . . .

Compute and populate the portion of span data required for span execution.

These tasks are discussed in detail in the sections below.

The transformation from corner-plane coordinates to interp coordinates can be performed using equations (26), (27), and (29), and the transformation can be applied to the coefficient matrix using equation (33). Making use of the span data created during the SCB stage 210 performs the computations efficiently.

According to another aspect of the present invention, an additional responsibility of the forward transform stage 212 embodiment of the present invention can be to compute a set of constraint vectors for the span. The constraint vectors can be used to compute the span's maximum path speed, maximum path acceleration, maximum path jerk, and end of span speed constraint.

In this embodiment, the constraint vectors that are computed for every spline corner blend span include the following:

direction cosines at the start of span direction cosines at the end of the span curvature at the end of the span: blend1 curvature at the start of the span: blend2 maximum value of the tangent vector components over the span maximum value of the curvature vector components over the span maximum value of the vector components of the derivative of the curvature vector components over the span The following sections provide descriptions of how each of these vectors can be computed for each of the two spans that make up the fourth order polynomial spline corner blend. The computations can be optimized for the special case of a fourth order polynomial spline corner blend. It is contemplated that direct evaluation of the derivatives of the spline polynomial at the end points could be performed, but this would involve several multiplies per component per vector, and would be more time consuming.

According to one aspect of the invention, the control can use the next span's "start of span direction cosines" vector with the current span's "end of span direction cosines" vector to compute the current span's corner end of span speed constraint. In this context, the end of span speed constraint ensures that the configured maximum axis step velocities are not exceeded.

For spline corner blend spans of the embodiment of the invention discussed above, the step velocity that occurs at the end of the span is zero. This is the case, because these spline corner blend spans have an end of span direction cosine vector that is identically equal to the next span's start of span direction cosine vector. The computations of the start of span and end of span direction cosines (and curvatures) are necessary only for the components of these vectors that correspond to the spline axes, since it has already been assured that these are the only axes in motion.

In an exemplary embodiment, the start of span direction cosine for a span of the spline corner move1 type (the first half blend span) are copied forward from the linear span for the case of span insertion, and are untouched for the case of redefinition of the linear span. The first half blend span's end of span direction cosine components can be efficiently evaluated by rotating the direction cosines vector of the corner plane coordinate system into interp coordinates. Since, as discussed above, the end of span direction cosine of the first half blend span in corner plane coordinates is $\{1\ 0\}^T$ (so that the end of the span is parallel to the x-axis of the corner plane coordinate system) in an exemplary embodiment, then the end of span direction cosine of the first half blend span will be the first column of the rotation matrix.

The second half blend span's start of span direction cosine components can be efficiently obtained by copying forward the previous span's end of span direction cosine components (because the direction cosine at the end of the first half should be equal to the direction cosine at the start of the second half, as discussed above).

The second half blend span's end of span direction cosine can be computed by evaluating the derivative of the spline polynomial curve at the location where the spline parameter equals the span length.

$$blend2 \to \overrightarrow{eos\_dir\_cos} = \frac{d\vec{P}}{du}\bigg|_{u=S} = [A]\{4S^3 \quad 3S^2 \quad 2S \quad 1 \quad 0\}^T \quad (36)$$

where S is blend2's span length and A is blend2's coefficient matrix.

The start of span curvature for the first half blend of the above-described embodiment of the invention is always zero because a SCB span always transitions from a linear span with zero curvature. Since a span's curvature data always initializes to zero, and since a blend may only be inserted after a linear span which has zero curvature, no action need be required to set the start of span curvature variable to zero, as it can already be initialized as such.

The end of span curvature for the first half blend is the end of span curvature in corner plane coordinates rotated into interp coordinates. Since the end of span curvature in corner plane coordinates is $\{0 - \kappa\}^T$, the end of span curvature in interp coordinates is the second column of the rotation matrix multiplied by $-\kappa$, where $\kappa$ is the peak curvature magnitude retained in span data.

The second half blend span's start of span curvature components can be efficiently obtained by copying forward the previous span's end of span curvature components, as they should be identical in the above-described embodiment (so that the two halves blend together with continuous curvature). The second half blend span's end of span curvature is always zero, as it should equal the curvature of the second linear span. Therefore, simply copying zeros to the components of the end of span curvature variable can set it.

The maximum tangent vector for the span can be composed of components that contain the maximum absolute value that the corresponding component of the unit tangent vector achieves during the span. The maximum tangent vector can be used to determine the following: 1) the span's maximum path velocity as constrained by the pre-configured maximum path speed and pre-configured maximum axis velocities, 2) the span's maximum path acceleration as constrained by the pre-configured maximum path acceleration and pre-configured maximum axis accelerations, and 3) the span's maximum path jerk as constrained by the pre-configured maximum path jerk and pre-configured maximum axis jerks (the pre-configured values are those maximum values set for the path or axes for optimum performance).

Each component of the maximum tangent vector for a span can be the maximum of the absolute value of the following quantities:

the start of span direction cosine vector component the end of span direction cosine vector component the absolute value of the tangent vector component at locations where the tangent vector component is extremized, if these locations lie on the span (A function, in this case the tangent vector component over points on the span specified by u, is said to be "extremized" when the function takes on either a maximum or minimum value relative to the surrounding locations on the function.)

This can be represented by the following equation for the generic axis component h (i.e. h is a spline axis).

$$\max\_\tan_h = \max(|sos\_dir\_cos_h|, |eos\_dir\_cos_h|, |\tan\_vec_h(u)|_{u=u_{ehp}}, |\tan\_vec_h(u)|_{u=u_{ehn}}) \quad (37)$$

In the previous equation, $u_{ehp}$ and $u_{ehn}$ represent the locations along the span where the unit tangent vector is extremized. For a fourth order polynomial spline, there are two locations where the unit tangent vector component is extremized. These locations may or may not be on the span. Only locations where the extremum occurs on the span, i.e., $0 < u_e < S$, are considered in equation (37).

The unit tangent vector at some point on the span defined by the parameter u is the following:

$$\{\tan\_vec(u)\} = [A]\{4u^3 \quad 3u^2 \quad 2u \quad 1 \quad 0\}^T \quad (38)$$

Accordingly, the locations where a unit tangent vector component is extremized can be determined by finding the roots of the derivative of the unit tangent vector component. The locations of the extrema for each spline coordinate can be derived as follows:

$$\frac{d}{du}\left([A]\{4u^3 \quad 3u^2 \quad 2u \quad 1 \quad 0\}^T\right) = \{0 \quad 0 \quad 0\}^T \quad (39)$$

Evaluation of the derivative in the previous equation yields the following three independent equations:

$$\begin{Bmatrix} 6A_{1,1}(u_{e1})^2 + 3A_{1,2}u_{e1} + A_{1,3} \\ 6A_{2,1}(u_{e2})^2 + 3A_{2,2}u_{e2} + A_{2,3} \\ 6A_{3,1}(u_{e3})^2 + 3A_{3,2}u_{e3} + A_{3,3} \end{Bmatrix} = \begin{Bmatrix} 0 \\ 0 \\ 0 \end{Bmatrix} \quad (40)$$

These are quadratic equations with two solutions each designated by the subscripts p and n.

$$\begin{Bmatrix} u_{e1p,n} \\ u_{e2p,n} \\ u_{e3p,n} \end{Bmatrix} = \begin{Bmatrix} \frac{0.5}{A_{1,1}} \cdot \left(-3A_{1,2} \pm \sqrt{9(A_{1,2})^2 - 24A_{1,1} \cdot A_{1,3}}\right) \\ \frac{0.5}{A_{2,1}} \cdot \left(-3A_{2,2} \pm \sqrt{9(A_{2,2})^2 - 24A_{2,1} \cdot A_{2,3}}\right) \\ \frac{0.5}{A_{3,1}} \cdot \left(-3A_{3,2} \pm \sqrt{9(A_{3,2})^2 - 24A_{3,1} \cdot A_{3,3}}\right) \end{Bmatrix} \quad (41)$$

Since the span length is a real number, the radical (term in the square root) must be greater than zero in order for the extreme point to be on the span. Thus, if the radical is less than zero, there is no extreme point on the span, and each component of the maximum tangent is the larger of the absolute value of the corresponding component of start of span direction cosine and end of span direction cosine. Consequently, if for the h'th component (h is one of the three spline axes, for example h∈{X, Y, Z}) the radical is greater than zero, then one or both of $u_{ehp}$ or $u_{ehn}$ has the potential to be on the span. Each value for $u_{ehp}$ and $u_{ehn}$ can be tested for being on the span, and only the values that are greater than 0 or less than the span length are considered. For those $u_e$ that lie on the span, the tan_vec(u) in equation (37) can be computed by evaluating equation (38) at $u=u_e$.

As with all constraint vectors discussed herein, in an exemplary embodiment, the maximum tangent vector is a 14-element array to account for all of the logical axes {e.g., X Y Z U V W A B C D E P Q R}. As can be understood, for spline spans, all the components of the maximum tangent vector, except for those corresponding to the coordinates of the spline axes, are zero-valued.

The maximum tangent vector components can then be used to determine the span's maximum speed limited by axis maximum velocities. This is one of several potential values for maximum speed as indicated by the subscript 1. The subscripts h1, h2, etc. are used to designate each of the logical axes.

$$\text{span\_max\_speed}_1 = \min\left(\frac{\text{max\_vel}_{h1}}{\text{max\_tan}_{h1}}, \frac{\text{max\_vel}_{h2}}{\text{max\_tan}_{h2}}, \ldots\right) \quad (101)$$

The maximum tangent vector components can also be used to determine the span's maximum tangential acceleration limited by the axis maximum acceleration.

$$\text{span\_max\_acc} = \min\left(\frac{\text{max\_acc}_{h1}}{\text{max\_tan}_{h1}}, \frac{\text{max\_acc}_{h2}}{\text{max\_tan}_{h2}}, \ldots\right) \quad (102)$$

The maximum tangent vector components can also be used to determine the span's maximum tangential jerk limited by the axis maximum jerk.

$$\text{span\_max\_jerk} = \min\left(\frac{\text{max\_jerk}_{h1}}{\text{max\_tan}_{h1}}, \frac{\text{max\_jerk}_{h2}}{\text{max\_tan}_{h2}}, \ldots\right) \quad (103)$$

In addition, this constraint vector aspect of the invention calculates the maximum absolute value that the curvature vector component experiences over the range of the span. This value can be used to determine the span's maximum velocity as limited by the pre-configured maximum axis accelerations.

Each component of the maximum curvature is the largest of the absolute value of the start of span curvature and end of span curvature for the span, and the curvature at the location on the span where curvature is extremized for that component. This can be represented by the following equation for the generic logical axis component (h) of the maximum curvature, where the computation is performed for those axes (h) that are spline axes:

$$\text{max\_curv}_h = \max(|\text{sos\_dir\_cos}_h|, |\text{eos\_dir\_cos}_h|, |\text{curv}_h(u)|_{u=u_e}) \quad (42)$$

In the previous equation, $u_e$ represents the location along the span where the h-axis component of the curvature vector is extremized. Only locations where the extremum occurs on the span, i.e., $0 < u_e < S$, are considered in equation (42).

The curvature vector of a span at some point along the span defined by the parameter u is shown below. This equation was obtained by double differentiating the position vector with respect to u (the distance along the span).

$$\{\text{curv}(u)\} = [A]\{12u^2 \quad 6u \quad 2 \quad 0 \quad 0\}^T \quad (43)$$

The location where the curvature component is extremized can be determined by finding the roots of the derivative of the same component's curvature vector. The locations of the extrema for each spline coordinate can be derived as follows:

$$\frac{d}{du}([A]\{12u^2 \quad 6u \quad 2 \quad 0 \quad 0\}^T) = \{0 \quad 0 \quad 0\}^T \quad (44)$$

Evaluation of the derivative in the previous equation yields the following three independent equations:

$$\begin{Bmatrix} 4A_{1,1}u_{e1} + A_{1,2} \\ 4A_{2,1}u_{e2} + A_{2,2} \\ 4A_{3,1}u_{e3} + A_{3,2} \end{Bmatrix} = \begin{Bmatrix} 0 \\ 0 \\ 0 \end{Bmatrix} \quad (45)$$

The solutions to these equations are the following:

$$\begin{Bmatrix} u_{e1} \\ u_{e2} \\ u_{e3} \end{Bmatrix} = \begin{Bmatrix} -0.25 A_{1,2}/A_{1,1} \\ -0.25 A_{2,2}/A_{2,1} \\ -0.25 A_{3,2}/A_{3,1} \end{Bmatrix} \quad (46)$$

Then, for each component (spline axis), the value for $u_e$ can be tested to determine whether it is greater than zero and less than span length. If this is the case, then the curvature component at this location can be evaluated using equation (43) and included in equation (42); otherwise it is not. As with all constraint vectors, the maximum curvature can be a 14-element array to account for all of the logical axes. Of course, for spline spans, all the components of the maximum curvature, except for those corresponding to the coordinates of the spline axes, are zero-valued.

The maximum curvature components can then be used to determine the span maximum speed limited by the axis maximum accelerations. The subscript 2 indicates that the axis acceleration constraints create one of several candidates for the span maximum speed constraint, the first candidate being describe above with respect to the maximum tangent constraint calculation.

$$\text{span\_max\_speed}_2 = \sqrt{\min\left(\frac{\text{max\_acc}_{h1}}{\text{max\_curv}_{h1}}, \frac{\text{max\_acc}_{h2}}{\text{max\_curv}_{h2}}, \ldots\right)} \quad (104)$$

There can be one more constraint vector calculation according to this embodiment—the vector whose components contain the maximum absolute values of the corresponding component of the change in curvature over the span. This quantity can be used to define the span's maximum velocity such that the individual axes' configured maximum jerks are not exceeded. The change in curvature at any point on the span can be computed by differentiating the curvature with respect to distance along the path.

$$\{d\text{curv\_ds}(u)\} = [A]\{24u \quad 6 \quad 0 \quad 0 \quad 0\}^T \quad (47)$$

The previous equation indicates that dcurv_ds varies linearly over the span. Thus, there is no extreme point and the maximum dcurv_ds is the larger of the absolute values of dcurv_ds at each end point. The following equations show how max_dcurv_ds can be computed for each of the three spline axes (components):

$$\text{max\_dcurv\_ds}_1 = \max(|6A_{1,2}|, |24A_{1,1} + 6A_{1,2}|)$$

$$\text{max\_dcurv\_ds}_2 = \max(|6A_{2,2}|, |24A_{2,1} + 6A_{2,2}|)$$

$$\text{max\_dcurv\_ds}_3 = \max(|6A_{3,2}|, |24A_{3,1} + 6A_{3,2}|) \quad (48)$$

The maximum dcurv_ds components can then be used to determine the span maximum speed limited by the axis maximum jerks. The subscript 3 indicates that the axis jerk constraints create one of several candidates for the span maximum speed constraint, the other two candidates being described above.

$$\text{span\_max\_speed}_3 = \qquad (105)$$
$$\left[\min\left(\frac{\max\_\text{jerk}_{g1}}{\max\_\text{dcurv\_ds}_{g1}}, \frac{\max\_\text{jerk}_{g2}}{\max\_\text{dcurve\_ds}_{g2}}, \ldots\right)\right]^{1/3}$$

Once the three candidate maximum speed constraints based on maximum axis velocities, jerks, and accelerations have been computed, the maximum speed constraint applied to the span can be computed by finding the minimum of the set.

$$\text{span\_max\_speed} = \min(\text{span\_max\_spd}_1, \text{span\_max\_spd}_2, \text{span\_max\_spd}_3,) \qquad (106)$$

Thus, according to this aspect of the invention, a maximum tangent vector, a maximum curvature vector, and a maximum change in curvature vector can be computed for the corner blend spans. This information can then be used to select a maximum speed constraint, a maximum acceleration constraint, and a maximum jerk constraint for the span. Once these constraints are determined, the CNC controller can ensure that they are not exceeded during motion through the span, such as in a manner known in the art.

Execution of the Spline Span

In an exemplary embodiment, the spline corner blend spans discussed above are executed on the machine tool using interpolation. Once the spline span's length, coefficient matrix, and constraint vectors are computed, the span execution data for the span can be updated to allow for actual movement according to the revised spans. As known in the art, on a digitally controlled CNC, a spline span can be interpolated at regular time intervals by an interpolator (which can be incorporated in the position command generator 414 of FIG. 1) in such a way as to achieve a desired velocity along the path (i.e., path speed or feedrate). The span execution data can be modified to suit the particular implementation and requirements of the interpolator.

In the present embodiment, the interpolator can be informed of the path type of the span (e.g., spline or linear). In addition, the interpolator can be informed that the span involves programmable motion on all three of the axes associated with the spline coordinate system. Moreover, the interpolator can be informed of the mapping from the spline Cartesian coordinate system to the logical axis system. Copying the logical axis equivalent for each spline coordinate to the span execution data structure can do this.

In this embodiment, the tasks which pertain to interpolation of polynomial splines in a discrete time digital controller include: 1) a velocity manager determines the instantaneous feedrate desired for the current time interval, uses this value to determine the required incremental motion along the span during the current time interval, and updates the distance along the span s(t) defining the next required interpolation point, and 2) the spline interpolator operates on s(t) as the parameter in the spline polynomial to determine the axis command positions for the current time interval of the digital controller. The interpolator can evaluate the fourth order polynomial based on the span data representing the coefficient matrix A:

$$\begin{Bmatrix} x(t) \\ y(t) \\ z(t) \end{Bmatrix} = \begin{bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \end{bmatrix} \begin{Bmatrix} s(t)^4 \\ s(t)^3 \\ s(t)^2 \\ s(t) \\ 1 \end{Bmatrix} \qquad (49)$$

The matrix equation (49) can be efficiently evaluated using the following equations.

$$x = (((a_{11}s + a_{12})s + a_{13})s + a_{14})s + a_{15}$$
$$y = (((a_{21}s + a_{22})s + a_{23})s + a_{24})s + a_{25}$$
$$z = (((a_{31}s + a_{32})s + a_{33})s + a_{34})s + a_{35} \qquad (50)$$

As seen, four multiplies and four adds per axis per time interval are needed, using this exemplary method, so that a total of twelve multiplies and twelve adds are required. This is three fewer multiples than is required if equation (49) is directly evaluated.

Example of an Exemplary Embodiment

The benefits of the exemplary embodiment of the spline corner blend described herein relative to insertion of circular arcs or step velocities will be illustrated by the following example, which is illustrated by FIGS. 12–15. The example is for a case where a 5 mm X-axis move is followed by a 5 mm Y-axis move, beginning and ending in a full stop. The programmed feedrate for the move is about 2500 mm/min. The 90 degree corner formed by the two spans is traversed using three different methods: 1) spline corner blend (SCB) with feedforward enabled, 2) inserted circular arcs with feedforward enabled, and 3) step velocity at a sharp corner with feedforward disabled. The axis configuration parameters for this example are typical for a general-purpose small vertical machining center.

For the SCB case, a corner blend tolerance of about 0.5 mm has been selected in this example. For the circular arc case, an arc radius of about 1.207 mm is used, as it will cause the closest approach to the corner to also be about 0.5 mm. A corner tolerance of about 0.5 mm is selected for the first two cases in this example because this is the approximate degree of corner rounding that occurs in the third case where the move is executed with a step velocity at the corner.

The degree of corner rounding for the step velocity case is primarily a function of the programmed feedrate (e.g., 2500 mm/min), the configured axis step velocities (e.g., 2000 mm/min for X and Y), and the configured axis position loop gain (e.g., Kv of 2.5 mm/min/micron). The step velocity case has feedforward disabled, as this is a typical requirement for cases that involve substantial discontinuities in the velocities of the axis, commands. Feedforward cannot be applied together with step velocities because the configured values for maximum step velocities are typically selected such that the axis is operating at maximum capability with feedforward off. If feedforward were to be used during a step velocity case, then the requirement to operate within the capability of the axis will result in a setting of maximum step velocity that is so low it will cause the axes to experience a virtual full stop at a sharp corner.

For the cases where feedforward is enabled, it is assumed that the actual axis positions track the command positions precisely. For the case where feedforward is disabled, it is assumed that the actual axis positions track the command positions with amplitude attenuations and phase shifts characteristic of a first order low-pass dynamic, which is the typical dominant dynamic of a machine tool axis position control loop.

Figure 12:
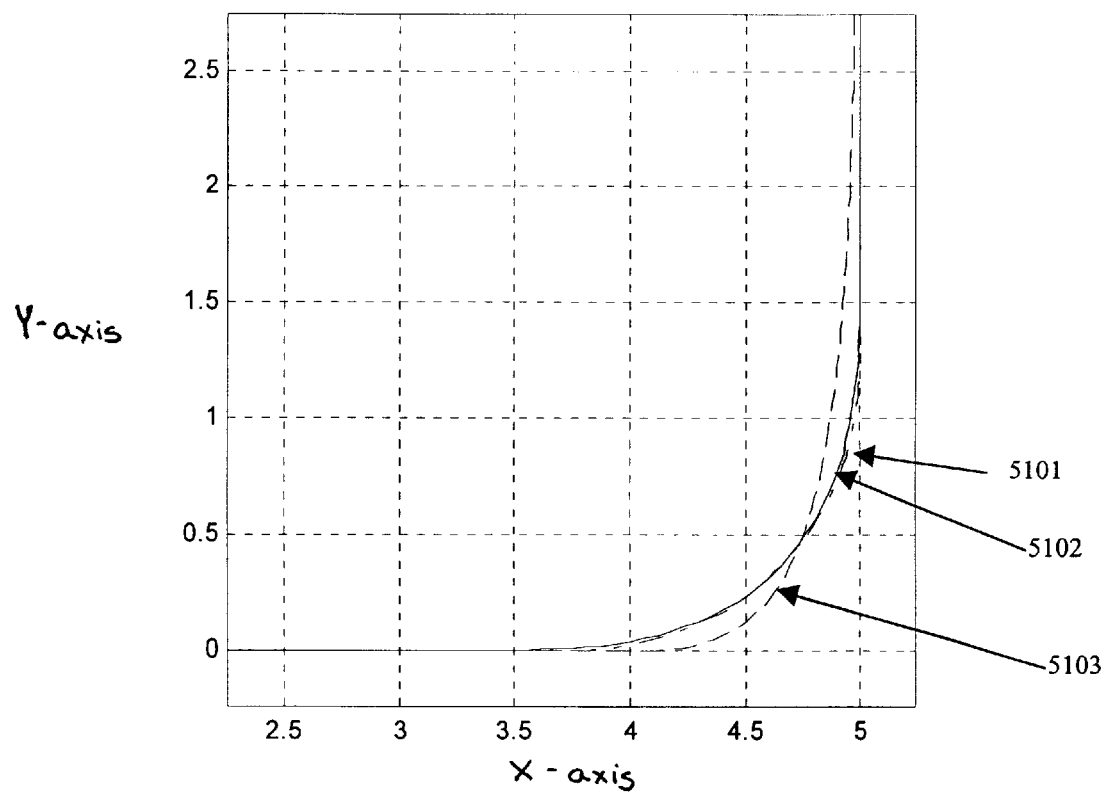
FIG. 12 illustrates X-Y plots of axis path for test cases involving an implementation of an exemplary embodiment of the present invention and conventional approaches.

The paths traversed for each of the test cases are shown in FIG. 12. The paths traversed for the SCB case and the circular arc case, traces 5101 and 5102, respectively, are virtually indistinguishable. However, distinctions between these cases do exist and will be apparent when the axis velocity, acceleration, and jerk profiles are examined below.

The path traversed for the step velocity case is shown in trace 5103. The path is clearly asymmetrical. The asymmetry is caused by the phase lag characteristic of the position controller that does not utilize feedforward capability. The degree of asymmetry is a function of the feedrate, configured maximum -step velocity, and Kv gain. The asymmetry associated with the step velocity case can be problematic for several reasons, including the following: 1) the shape of the contour is difficult to predict in advance, 2) the shape of the contour for corners traversed in a counter clockwise direction will be different than the shape of the same corner traversed in a clockwise direction, and 3) the path traversed by the axes continues to deviate from the ideal path long after the corner has been rounded.

As can be seen from FIG. 12, the methods of circular arc insertion and spline corner blend are superior to the step velocity method. Meanwhile, the benefits of spline corner blend relative to a circular arc will be demonstrated in comparisons of velocity, acceleration, and jerk plots for the two cases.

Figure 13A:
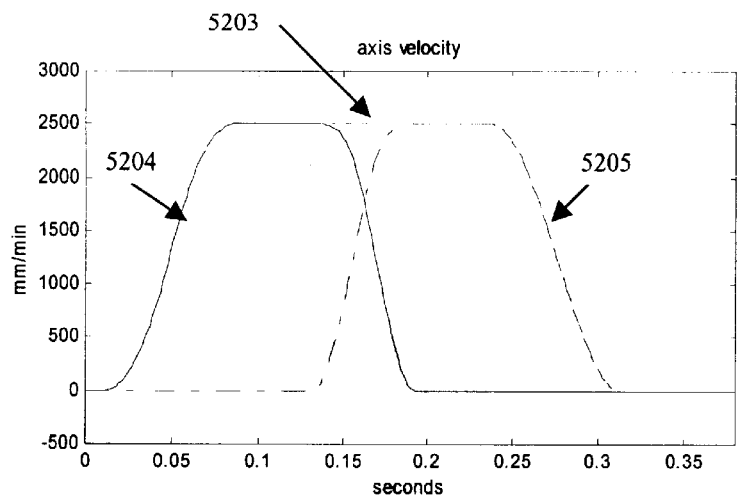
FIG. 13A–13C illustrates velocity, acceleration, and jerk profiles of a test case involving an implementation of an exemplary embodiment of the present invention.
Figure 14A:
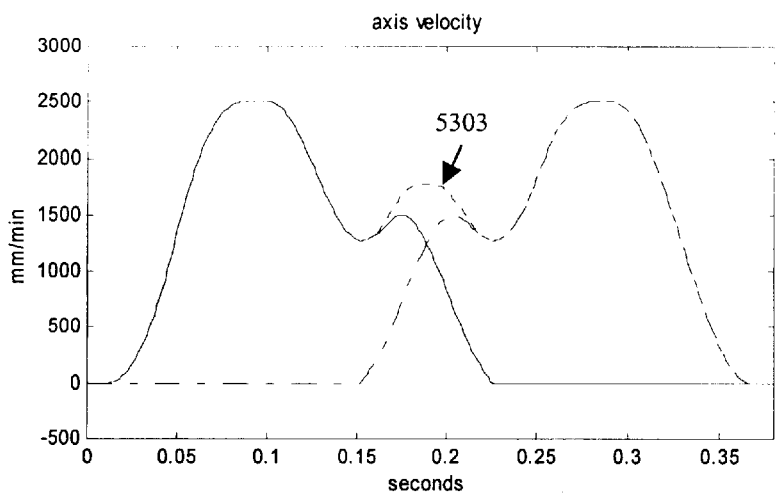
Figure 15A:
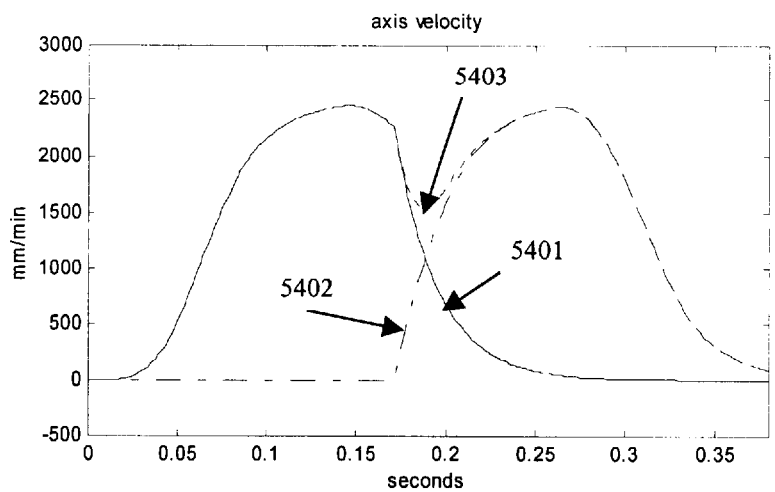
FIG. 15A–15C illustrates velocity, acceleration, and jerk profiles of a test case involving a second conventional approach.

The velocity profiles for the SCB, circular-arc, and step-velocity cases are respectively shown in FIGS. 13A, 14A, and 15A. Each of these figures contain traces of X-axis velocity, Y-axis velocity and path speed as a function of time. The path speed is the velocity of the combined axis motion tangent to the path in X-Y space.

For the SCB case, the X-axis accelerates from zero velocity to the programmed feedrate in about 0.07 seconds. During the initial portion of the move, the X-axis is moving by itself, thus the path speed 5203 is equivalent to the X-axis velocity 5204. During the final portion of the move, the Y-axis is moving by itself, thus the path speed 5203 is equivalent to the Y-axis velocity 5205.

At the corner, the path speed 5203 remains constant. Meanwhile, the X-axis velocity 5204 is gradually reduced from the programmed feedrate to zero and the Y-axis axis velocity 5205 is gradually increased from zero to the programmed velocity. The total time to execute the move using the SCB method is approximately 0.31 seconds.

As shown in FIG. 14A, the case of the circular arc method requires more time (approximately 0.36 seconds) to execute. A potential reason for this is that the transition between the linear span and the circular arc involves a step discontinuity in axis acceleration. In order to keep the axis jerks within their configured maximum values, it is typically necessary for the control to lower the feedrate prior to the transition between the X-axis move and the circular arc, and again prior to the transition from the circular arc to the Y-axis move. This can be seen by observing how the path speed 5303 is reduced (e.g., to approximately 1000 mm/min) for the transition from the X-axis move to the circular arc (at approximately 0.15 seconds). The path speed 5303 then increases toward its programmed value, but does not reach the programmed value as it again must be reduced (e.g., to approximately 1000 mm/min) for the transition between the circular arc and Y-axis move (at approximately 0.22 seconds).

As shown in FIG. 15A, the case of the step velocity method also takes more time to execute (approximately 0.37 seconds) than the SCB case because the control had to lower the path speed 5403 just before the corner to prevent the X and Y-axes from experiencing velocity steps (discontinuities) that are greater than the configured maximum allowed step velocity. The X and Y-axis velocities 5401 and 5402, respectively, and the path speed 5403 are asymmetrical due to the effects of the first order dynamics in the position control loop without feedforward. The first order exponential response characteristic of a step velocity command can be seen by analysis of velocities 5401 and 5402.

Figure 13B:
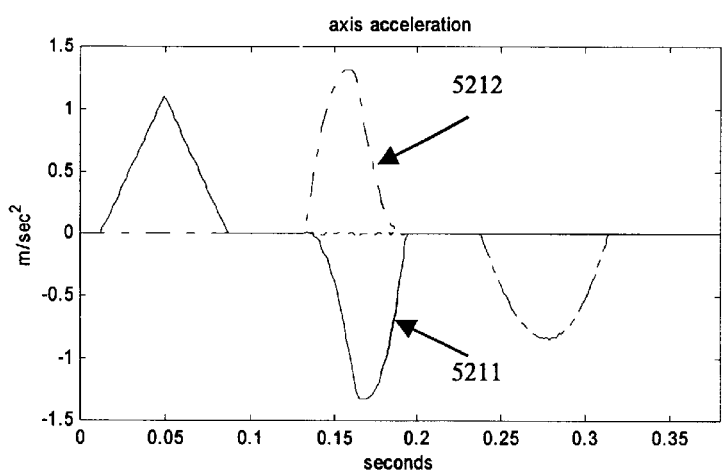
Figure 14B:
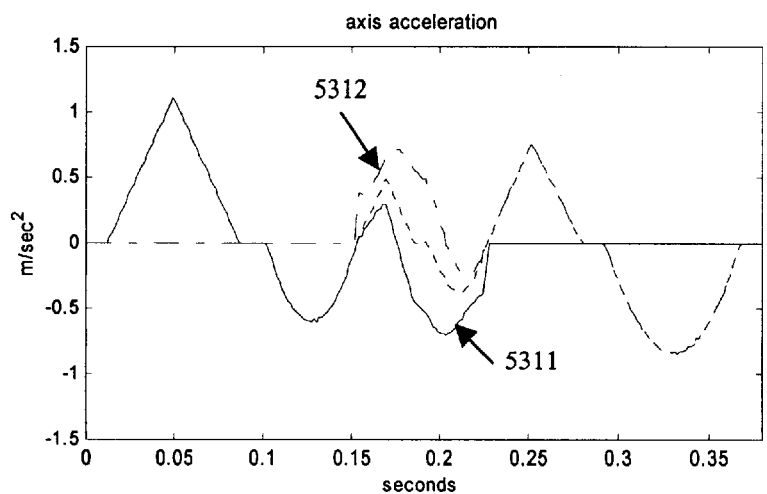
Figure 15B:
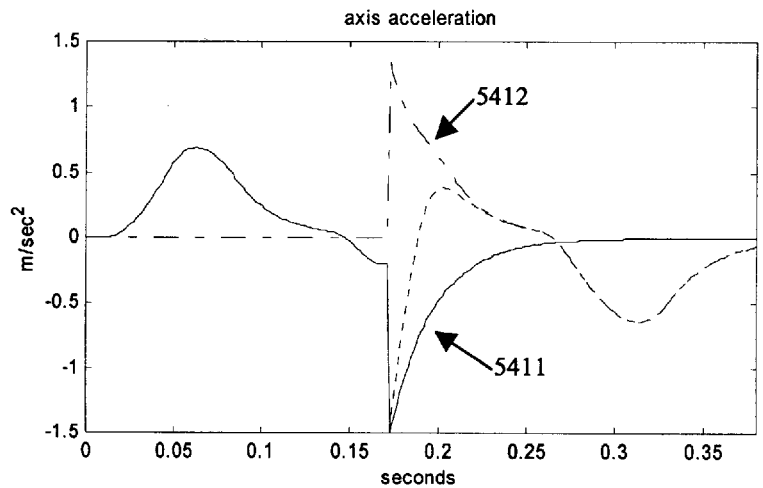

Examination of the plots of axis and path acceleration versus time for SCB, inserted-circular-arc, and step velocity in FIGS. 13B, 14B, and 15B, respectively, indicates that, for all three cases, the maximum X and Y-axis accelerations are within their configured limits (e.g., 2.5 m/sec$^2$). In these plots, the path acceleration is the component of acceleration that is tangent to the path in X-Y space.

For the SCB case, at the corner, the X and Y-axis accelerations 5211 and 5212, respectively, are smooth continuous functions. For the circular-arc case, at the corner, the X and Y-axis accelerations 5311 and 5312, respectively, experience moderate step discontinuities. For example, the Y-axis acceleration 5312 experiences an acceleration step of about 0.4 m/sec$^2$ where the X-axis move transitions to the circular arc (at approximately 0.15 seconds). Meanwhile, the X-axis acceleration 5311 experiences a discontinuity of about 0.4 m/sec$^2$ where the circular arc transitions to the Y-axis move (at approximately 0.22 seconds). For the step velocity case, the X and Y-axis accelerations 5411 and 5412, respectively, experience large step discontinuities at the commanded sharp corner.

Figure 13C:
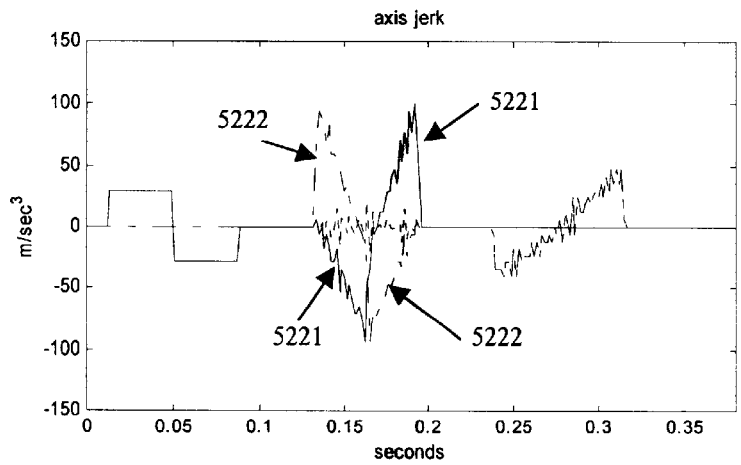
Figure 14C:
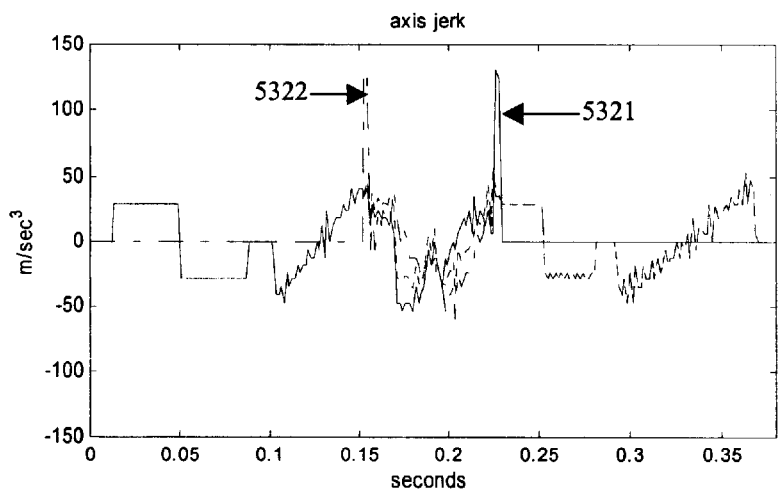
Figure 15C:
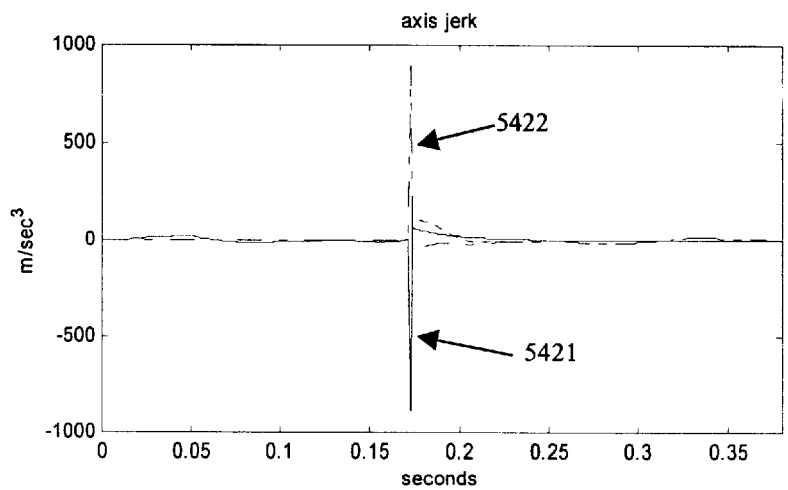

The axis jerks and path jerk for the SCB, circular-arc, and step velocity test cases are shown in FIGS. 13C, 14C, and 15C, respectively. The path jerk is the component of jerk that is tangent to the path in X-Y space. For the SCB case, the X-axis jerk 5221 and the Y-axis jerk 5222 both take on a maximum value of approximately 100 m/sec$^2$ at the corner, which is well within the allowable maximum (e.g., of 150 m/sec$^2$). For the circular arc case, the X-axis jerk 5321 and the Y-axis jerk 5322 each take on a maximum value of approximately 140 m/sec$^3$, which is approximately the maximum allowable value. The jerks 5321 and 5322 do not reach the precise maximum due to the presence of the control's span blending algorithms.

The X and Y-axis jerks for the step-velocity case are respectively shown in FIG. 15C as traces 5421 and 5422. In this case, the jerks greatly exceed the axis maximum. Such high levels of jerk can cause problems such as axis mechanical vibrations and machine wear and tear.

While very detailed equations and potential implementations of a corner blending method and apparatus for a motion control system have been presented, these examples should not be considered limiting in nature. These exemplary embodiments are shown and described simply for the purposes of illustrating potential ways to make and use the invention, including a best mode contemplated for carrying out the invention. As will be realized, the invention is capable of other different aspects and embodiments without departing from the scope of the invention.

For example, while a fourth order polynomial can be used in the corner blend as described above, and while it has been found that such polynomials provide good results and desirable curvature, it is contemplated that other types of polynomials 30 could be utilized. In addition, while the corner blend has been described as comprising a pair of spline spans in one embodiment, it is contemplated that more or fewer spans could be utilized to create the corner blend. Moreover, although an exemplary finite state machine that operates in discrete time has been described, it is contemplated that other implementations and embodiments of the present invention are possible. Digital circuitry is expected to be a method for controlling CNC machines, so the discussion herein has emphasized digital electronics.

What is claimed is:

1. A method for controlling motion through consecutive linear spans which define a corner in a desired motion path, the method comprising:

providing a plurality of data points which define a desired motion path, the plurality of data points defining a plurality of consecutive spans;

determining whether two consecutive linear spans define a corner having an angle within a predetermined range;

if two consecutive linear spans define a corner having an angle within the predetermined range, determining a non-linear path which connects to the two consecutive linear spans with continuity in curvature, wherein the non-linear path comprises two fourth order polynomial functions; and controlling an actuator according to the non-linear path which is determined.

2. The method as recited in claim 1, further comprising shortening the two consecutive linear spans.

3. The method as recited in claim 1, wherein the actuator is moved through the non-linear path with continuity in velocity, continuity in acceleration, and continuity in jerk.

4. The method as recited in claim 1, wherein the non-linear path comprises a fourth order polynomial function in the parameter u, where u is an estimate of the distance along the non-linear path.

5. The method as recited in claim 1, wherein the step of determining the non-linear path, includes the steps of:

selecting a local coordinate system;

computing a coefficient matrix to represent the non-linear path; and transforming the matrix to a global coordinate system.

6. The method as recited in claim 1, further comprising the steps of determining a maximum speed constraint for the non-linear path, wherein the actuator is controlled according to the maximum speed constraint.

7. The method as recited in claim 1, wherein the first determining step comprises:

comparing the angle defined by the direction cosine vectors of the two linear spans to a minimum threshold; and comparing the angle defined by the direction cosine vectors of the two linear spans to a maximum threshold.

8. A method for traversing a corner in a controlled motion path, the method comprising:

providing a desired motion path which includes a corner portion;

determining a non-linear path for traversing the corner portion;

calculating a maximum speed for the non-linear path;

moving a movable member according to the non-linear path instead of the corner portion, wherein the movement is constrained by the maximum speed calculated;

wherein calculating a maximum speed further comprises the steps of:

calculating a maximum tangent vector for the non-linear path;

calculating a maximum curvature vector for the non-linear path; and calculating a maximum change in curvature vector for the non-linear path;

wherein the maximum speed determining step further comprises the steps of:

calculating a first maximum speed using the maximum tangent vector to constrain the path maximum velocities;

calculating a second maximum speed using the maximum curvature vector to constrain the path maximum accelerations;

calculating a third maximum speed using the maximum change in curvature vector to constrain the path maximum jerks; and selecting the maximum speed from the minimum of the first, second, and third maximum speeds.

9. The method as recited in claim 8, further comprising calculating a maximum acceleration for the non-linear path, wherein the movement is constrained by the maximum acceleration calculated.

10. The method as recited in claim 8, further comprising calculating a maximum jerk for the non-linear path, wherein the movement is constrained by the maximum jerk calculated.

11. A method for traversing a corner in a controlled motion path, the method comprising:

providing a desired motion path which includes a corner portion;

determining a non-linear path for traversing the corner portion;

calculating a maximum speed for the non-linear path;

moving a movable member according to the non-linear path instead of the corner portion, wherein the movement is constrained by the maximum speed calculated;

wherein calculating a maximum speed further comprising the steps of:

calculating a maximum tangent vector for the non-linear path;

calculating a maximum curvature vector for the non-linear path;

calculating a maximum change in curvature vector for the non-linear path calculating a first maximum speed using the maximum tangent vector to constrain the path maximum velocities;

calculating a second maximum speed using the maximum curvature vector to constrain the path maximum accelerations;

calculating a third maximum speed using the maximum change in curvature vector to constrain the path maximum jerks; and selecting the maximum speed from the minimum of the first, second, and third maximum speeds.

12. The method as recited in claim 11, further comprising calculating a maximum acceleration for the non-linear path, wherein the movement is constrained by the maximum acceleration calculated.

13. The method as recited in claim 11, further comprising calculating a maximum jerk for the non-linear path, wherein the movement is constrained by the maximum jerk calculated.

* * * * *